(12) United States Patent
Mohaghegh et al.

(10) Patent No.: US 10,677,046 B2
(45) Date of Patent: Jun. 9, 2020

(54) LEAKAGE DETECTION USING SMART FIELD TECHNOLOGY

(71) Applicant: West Virginia University, Morgantown, WV (US)

(72) Inventors: Shahab D. Mohaghegh, Morgantown, WV (US); Seyed Alireza Haghighat, State College, PA (US)

(73) Assignee: West Virginia University, Morgantown, WV (US)

( * ) Notice: Subject to any disclaimer, the term of this patent is extended or adjusted under 35 U.S.C. 154(b) by 481 days.

(21) Appl. No.: 15/091,176

(22) Filed: Apr. 5, 2016

(65) Prior Publication Data

US 2016/0298447 A1 Oct. 13, 2016

Related U.S. Application Data

(60) Provisional application No. 62/144,035, filed on Apr. 7, 2015.

(51) Int. Cl.
| | | |
|---|---|---|
| G01N 15/08 | (2006.01) | |
| E21B 47/10 | (2012.01) | |
| E21B 41/00 | (2006.01) | |

(52) U.S. Cl.
CPC .......... *E21B 47/10* (2013.01); *E21B 41/0064* (2013.01); *Y02C 10/14* (2013.01)

(58) Field of Classification Search
CPC ...... E21B 41/0064; E21B 43/00; E21B 47/10; E21B 49/00
USPC .................................................. 702/12; 703/5
See application file for complete search history.

(56) References Cited

U.S. PATENT DOCUMENTS

| | | | |
|---|---|---|---|
| 2004/0253734 A1* | 12/2004 | Firmin | E21B 47/06 436/28 |
| 2010/0145667 A1* | 6/2010 | Niu | E21B 43/00 703/5 |

OTHER PUBLICATIONS

Picard et al., Real-time monitoring of CO2 storage sites: application to Illinois Basin-Decatur Project, ScienceDirect, Energy Procedia 4 (2011) 5594-5598.*
Gaus et al., Geochemical and solute transport modelling for CO2 storage, what to expect from it?, BRGM—Geosciences for sustainable Earth 3 avenue C. Guillemin, 45060 Orleans, France (Feb. 22, 2011).*

(Continued)

*Primary Examiner* — Brook Kebede
(74) *Attorney, Agent, or Firm* — Thomas Horstemeyer, LLP

(57) ABSTRACT

Various examples are provided for gas leakage detection from geologic storage sites. In one example, a system for detection of gas leakage from a geologic storage site includes permanent down-hole gauges (PDGs) disposed at different depths within a well and an evaluation system that can determine a three-dimensional (3D) location of the gas leakage from the geologic storage site and a leakage indicator. The 3D location and leakage indicator can be determined using pressure data provided by the PDGs. The geologic storage site can store, e.g., $CO_2$, natural gas or other type of gas. In another example, a method for detecting gas leakage from a geologic storage site includes receiving pressure data provided by PDGs disposed within one or more wells associated with the geologic storage site, determining key performance indicators using the pressure data and determining a 3D location and a leakage indicator using the key performance indicators.

20 Claims, 32 Drawing Sheets

(56) References Cited

OTHER PUBLICATIONS

Haghighat et al., "Pressure History Matching for CO2 Storage in Saline Aquifers: Case Study for Citronelle Dome", Carbon Management Technology Conference, Oct. 2013.
Haghighat et al., "Using Big Data and Smart Field Technology for Detecting Leakage in a CO2 Storage Projects", SPE Annual Techical Conference and Exhibition, Sep. 2013.
Haghighat et al., "Interpretation of Real-Time Pressure Measurements to Detect CO2 Leakage", SPE Annual Techical Conference and Exhibition, Sep. 2015.
Mohaghegh et al., "Final Report: In-Situ MVA of CO2 Sequestration Using Smart Field Technology" for US DOE, Mar. 2015.

* cited by examiner

| Run | Leakage Location(X) Actual | Leakage Location(X) ILDS | Leakage Location(Y) Actual | Leakage Location(Y) ILDS |
|---|---|---|---|---|
| 1 | 1268902.53 | 1268903.05 | 11277566.74 | 11277569.97 |
| 2 | 1268902.53 | 1268902.78 | 11277566.74 | 11277566.13 |
| 3 | 1268902.53 | 1268902.55 | 11277566.74 | 11277567.57 |
| 4 | 1270359.37 | 1270358.03 | 11279158.24 | 11279157.46 |
| 5 | 1270359.37 | 1270359.11 | 11279158.24 | 11279157.51 |
| 6 | 1270359.37 | 1270359.17 | 11279158.24 | 11279157.44 |
| 7 | 1270184.29 | 1270184.53 | 11276221.98 | 11276223.47 |
| 8 | 1270184.29 | 1270185.16 | 11276221.98 | 11276224.14 |
| 9 | 1270184.29 | 1270183.81 | 11276221.98 | 11276222.66 |

| Rank | Feature | % Degree of Influence |
|------|---------------------|-----------------------|
| 1 | Cum Skewness(DeltP) | 100 |
| 2 | Cum ST Dev(DeltP) | 61 |
| 3 | Cum Avereage(DeltP) | 59 |
| 4 | Delp | 58 |
| 5 | Cum Kurtosis(DeltP) | 50 |
| 6 | Cum Sum(DeltP) | 26 |
| 7 | Derivitive | 2 |
| 8 | Time(New) | 1 |

FIG. 10A

| Rank | Feature | % Degree of Influence |
|------|---------------------|-----------------------|
| 1 | Cum ST Dev(DeltP) | 100 |
| 2 | Delp | 86 |
| 3 | Cum Avereage(DeltP) | 75 |
| 4 | Derivitive | 40 |
| 5 | Cum Sum(DeltP) | 36 |
| 6 | Cum Skewness(DeltP) | 5 |
| 7 | Cum Kurtosis(DeltP) | 3 |
| 8 | Time(New) | 1 |

FIG. 10B

ΔP -Well D-9-7 ,Leakage at Layer 5

| Two Well Leakage Rate(Mcf/day) | | | Three Well Leakage rate(Mcf/day) | | |
|---|---|---|---|---|---|
| D-9-6 | D-9-7 | D-9-8 | D-9-6 | D-9-7 | D-9-8 |
| 15 | 15 | 0 | 15 | 15 | 15 |
| 15 | 60 | 0 | 15 | 15 | 60 |
| 15 | 105 | 0 | 15 | 15 | 105 |
| 60 | 15 | 0 | 15 | 60 | 15 |
| 60 | 60 | 0 | 15 | 60 | 60 |
| 60 | 105 | 0 | 15 | 60 | 105 |
| 105 | 15 | 0 | 15 | 105 | 15 |
| 105 | 60 | 0 | 15 | 105 | 60 |
| 105 | 105 | 0 | 15 | 105 | 105 |
| 15 | 0 | 15 | 60 | 15 | 15 |
| 15 | 0 | 60 | 60 | 15 | 60 |
| 15 | 0 | 105 | 60 | 15 | 105 |
| 60 | 0 | 15 | 60 | 60 | 15 |
| 60 | 0 | 60 | 60 | 60 | 60 |
| 60 | 0 | 105 | 60 | 60 | 105 |
| 105 | 0 | 15 | 60 | 105 | 15 |
| 105 | 0 | 60 | 60 | 105 | 60 |
| 105 | 0 | 105 | 60 | 105 | 105 |
| 0 | 15 | 15 | 105 | 15 | 15 |
| 0 | 15 | 60 | 105 | 15 | 60 |
| 0 | 15 | 105 | 105 | 15 | 105 |
| 0 | 60 | 15 | 105 | 60 | 15 |
| 0 | 60 | 60 | 105 | 60 | 60 |
| 0 | 60 | 105 | 105 | 60 | 105 |
| 0 | 105 | 15 | 105 | 105 | 15 |
| 0 | 105 | 60 | 105 | 105 | 60 |
| 0 | 105 | 105 | 105 | 105 | 105 |

FIG. 28A

LEAKAGE DETECTION USING SMART FIELD TECHNOLOGY

CROSS REFERENCE TO RELATED APPLICATIONS

This application claims priority to, and the benefit of, U.S. provisional application entitled "$CO_2$ LEAKAGE DETECTION USING SMART FIELD TECHNOLOGY" having Ser. No. 62/144,035, filed Apr. 7, 2015, which is hereby incorporated by reference in its entirety.

RESEARCH OR DEVELOPMENT

This invention was made with government support under grant no. DE-FE0001163 awarded by the Department of Energy. The Government has certain rights in the invention.

BACKGROUND

Geological sequestration of carbon dioxide ($CO_2$) is one of various developing technologies that can be used to reduce the emission of $CO_2$ and mitigate greenhouse effects. This technology, which is also named CCS (Carbon Capture and Storage), captures the $CO_2$ from production sources like power plants (coal or gas fired) and transfers it to sink or storage sites (or geologic unit). Geological $CO_2$ storage sites can include hydrocarbon reservoirs, deep saline reservoirs and coal bed formations. The $CO_2$ can then be injected, preferably in the supercritical phase, into the underground sites for long term storage. However, it is possible that the sequestrated $CO_2$ could leak back into the atmosphere through some leakage paths, leading to negate the benefits of geologic $CO_2$ sequestration.

Geological sequestration of natural gas is also possible. Natural gas is usually produced in southern states and delivered to northern states for storage in underground reservoirs during the warmer months for later use during the colder winter months. The natural gas is stored underground by injecting the gas at pressures higher than the native pressure of the reservoir (or storage site) for later extraction and use. One example of this is the SoCal Gas Site at Porter Ranch, Calif. However, it is possible that the stored natural gas could leak out of the reservoir, potentially leading to economic hardship and environmental problems.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 10A and 10B illustrate key performance indicators for determination of leakage location and leakage rate in accordance with various embodiments of the present disclosure.

FIGS. 28A-28E illustrate examples of multi-well leakage in accordance with various embodiments of the present disclosure.

DETAILED DESCRIPTION

Figures 1, 2:
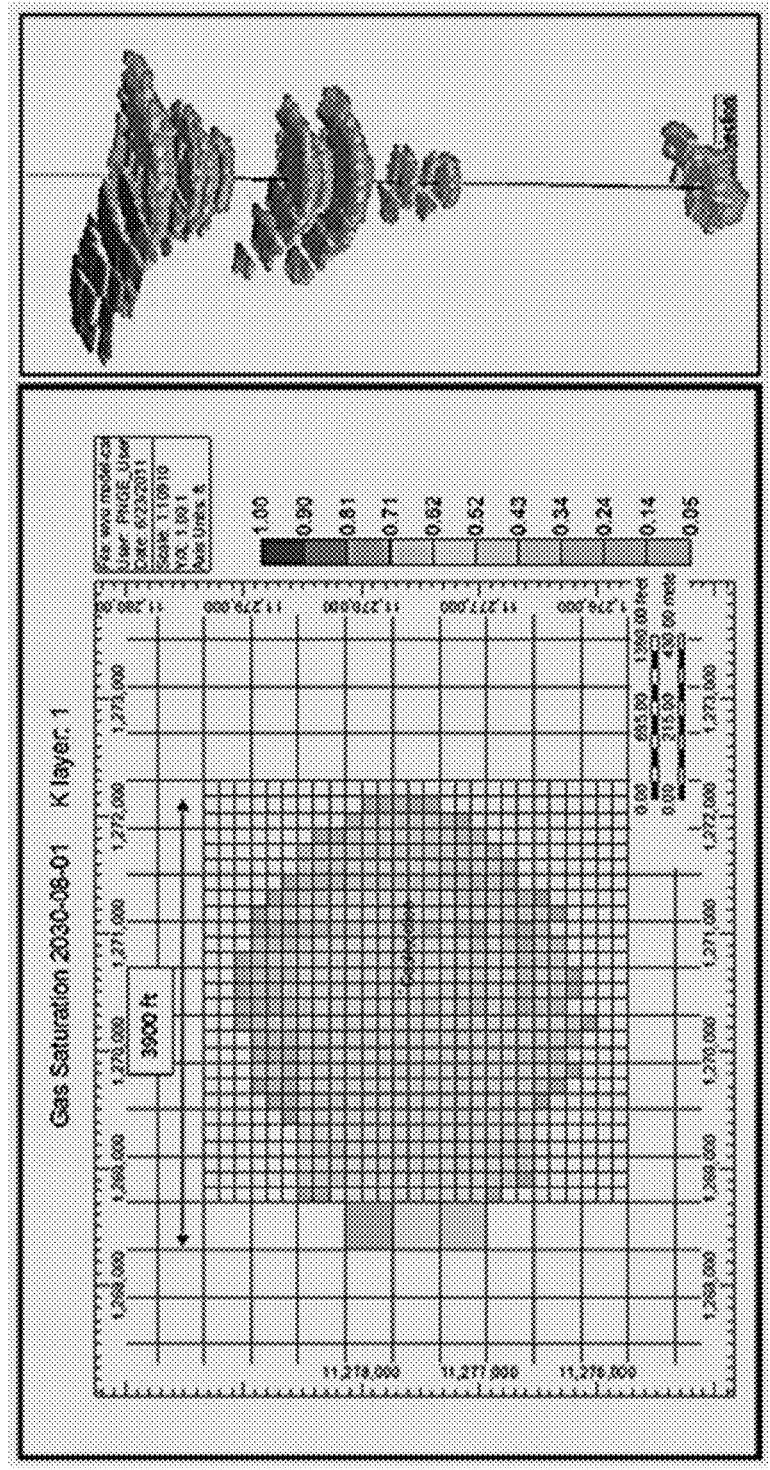
FIG. 1 is a table listing porosity and permeability values for an example of a reservoir simulation model in accordance with various embodiments of the present disclosure.
FIG. 2 includes views illustrating the reservoir simulation model of FIG. 1 in accordance with various embodiments of the present disclosure.

Disclosed herein are various embodiments related to gas leakage detection from geologic storage sites. While leakage detection is generally discussed in the context of stored $CO_2$, the described gas leakage detection is equally applicable to other gases such as, e.g., natural gas that are stored in geologic storage sites. Reference will now be made in detail to the description of the embodiments as illustrated in the drawings, wherein like reference numbers indicate like parts throughout the several views.

Geologic $CO_2$ sequestration can be used to confine injected $CO_2$ for a long period of time. Carbon Capture and Storage (CCS) projects are subject to monitoring and verification programs to ensure the storage is operating safely. Other gases such as natural gas, which are produced and shipped to other states for underground storage and subsequent production and use, can also be subject to monitoring to ensure detection of any leakage. One concern for geologic sequestration of $CO_2$ is the capability of the underground carbon dioxide storage to confine and sustain the injected $CO_2$ for long periods of time. To verify that the stored $CO_2$ (or other gas) remains in the underground storage, monitoring for leakage can be carried out to detect leakage. If leakage from a geological $CO_2$ sequestration site occurs, it is advantageous to find the approximate amount and the location of the leak, in a timely manner, in order to initiate proper remedial activities.

Leakage paths can include natural or induced discontinuities in the reservoir's seal (or cap rock) like inappropriately cemented wells, unsealed faults, high permeable regions, and fractures. To assure the cap rock integrity, $CO_2$ (or other gas) storage sites can include one or more active monitoring systems to detect $CO_2$ leakage (or leakage of other gases). If a leakage from a geological sink occurs, finding the approximate location and amount of the leak allows proper remediation activity to be taken. Research and development for storage site monitoring has been concentrated on atmospheric, surface or near surface monitoring of the sequestered $CO_2$ (and/or other gas or gases). In the event of leakage in a geological sequestration site, the $CO_2$ (or other gas) will move (at the reservoir level) before it can reach the surface.

Various techniques can be used for monitoring the underground geological sites, depending on accessibility and geological characteristics. The monitoring methods can be classified into two different categories: surface and underground measurements. In surface monitoring activities, the presence of $CO_2$ (or other gas) on the ground can be traced directly. Satellite-based optical methods, gas sampling, EM and gravity survey are considered surface or near surface monitoring. The other monitoring method that can be implemented by oil and gas industry is underground monitoring, which is focused on the underground storage or at the reservoir level where the actual $CO_2$ (or other gas) sequestration is taking place. Well logs (Pulsed Neutron, RST), 4D seismic, borehole gravity, cross well seismic, brine-gas composition sampling and introduced tracers can also be applied to monitor the underground movement of $CO_2$ (or other gas).

For surface monitoring to be effective, $CO_2$ (or other gas) needs to appear on the surface for detection. In the case of satellite image processing, it can be difficult to determine whether ground level movement is due to $CO_2$ (or other gas) leakage or other physical phenomena. Regarding underground monitoring, since most of these methods are implemented periodically, it is not possible to detect any leakage during the time interval when no test or monitoring is offered. Thus, remediation activity and response to leakage can be considered to be reactive with some time lag. Real-time or online monitoring systems offer the ability to detect $CO_2$ (or other gas) leakage without delay, which leads to much more efficient gas leakage risk management.

Permanent down-hole gauges (PDGs) and valves can be used for continuous monitoring of pressure, temperature, acoustic impedance, flow rates, and automatic flow controls. This technology can be used in the underground $CO_2$ (or other gas) reservoirs to monitor the pressure in real-time. The reservoir pressure data provides valuable information in order to history match and update the reservoir simulation model. More importantly, PDGs monitor the pressure changes during the formation of a leak and transmit high frequency data streams to the surface. The pressure changes in the reservoir can provide an indication of fluid flow (movement) in the formation which potentially can be due to $CO_2$ (or other gas) leakage. By analyzing the pressure change behavior, it is possible to determine various leakage characteristics, such as location and rate.

A reservoir simulation model for the $CO_2$ sequestration (or natural gas or other gas storage reservoir) can be developed to assist in the leakage detection. Multiple scenarios of $CO_2$ (or other gas) leakage can be modeled and high frequency pressure data from PDGs installed in the observation well can be collected to help accommodate $CO_2$ (or other gas) leak detection. High frequency data streams can be processed in real-time, summarized (e.g., by descriptive statistics) and transformed into a format appropriate for pattern recognition. This data can be streamed in real-time while being stored in data histories. The complexity of the pressure signal behaviors and the reservoir model makes the use of inverse solution of analytical models impractical. Successful detection of location and amount of $CO_2$ (or other gas) leaking from the reservoir using the real-time data streams demonstrates the power of pattern recognition and machine learning as a reservoir and operational management tool for smart fields.

The movement of fluids in a reservoir can be associated with pressure differences. Therefore, if the pressure changes in the reservoir can be detected and analyzed effectively, it is possible to identify and characterize such a leak, long before any surface or near surface leakage detection technology can effectively be utilized. It is possible to monitor the integrity of $CO_2$ (or other gas) storage at the reservoir level, in real-time and analyze and report the location and/or the amount of $CO_2$ leakage soon after such incident takes place. In-situ $CO_2$ (or other gas) monitoring and verification technology can be based on the implementation of permanent down-hole gauges (PDGs) or "Smart Wells" (for the detection purposes) along with artificial intelligence and data mining (AI&DM) for the analysis of the detected signals in order to identify the amount and the location of the leak. The technology can be used to identify the characteristics of the $CO_2$ (or other gas) leakage by de-convolving the pressure signals collected from the PDGs.

The concept of a "Smart Field" may be used by the oil and gas industry. Highly sensitive PDGs have been developed that are capable of successful operation in harsh environments for very long periods of time. PDGs collect and transmit high frequency data streams to the remote offices to be analyzed and used for reservoir management. State-of-the-art software solutions can be developed to take maximum advantage of the large amount of data that is collected, transmitted and stored in data historians using PDGs.

PDGs monitor the pressure changes in the formation and transmit high frequency data streams to the surface. The pressure changes in the reservoir can be used as indications of fluid flow (or movement) in the formation which during the post-injection time-frame indicates a potential leak in the system. The complex and highly convoluted real-time data transmitted by multiple PDGs can be cleansed, summarized, processed and modeled using state-of-the-art artificial intelligence and data mining (AI&DM) technology in order to identify the approximate location and/or the amount of $CO_2$ (or other gas) leakage that has caused the pressure change in the reservoir.

A four-step procedure can be used to accomplish this. First, a base reservoir model can be developed for a $CO_2$ sequestration site (or gas storage site) such as, e.g., the Citronelle Dome in Alabama. Second, actual field data ($CO_2$ or other gas injection) can be used to history match the base model. Third, multiple leakage scenarios can be generated using the history matched reservoir model and collection of the high frequency pressure signals that result from the imposed leakage in the system. Finally, the high frequency pressure signals can be processed and analyzed using machine learning and pattern recognition technology in order to identify the location and the amount of the leakage in the system.

As an example, a reservoir model for the Citronelle saline aquifer of the Citronelle field, a saline aquifer reservoir, located in the state of Alabama was developed and history matched with real field data. This model acknowledged "Lateral Heterogeneity". Structural maps for 17 sand layers (the most extensive ones that were targeted for $CO_2$ injection) were generated by interpretation and correlation of 14 well logs. Based on the correlation between the wells, 17 top maps were generated representing the lateral heterogeneity in the reservoir. The same well logs were used to generate thickness (isopach) maps for the layers. In order to make porosity maps, 40 well logs were analyzed and interpreted. Three different porosity maps were generated for each sand layer (for a total of 51 total porosity maps for the entire reservoir). Permeability of the reservoir was obtained using porosity-permeability correlations from core analysis.

Installed PDGs at the injection well and an observation well were modeled as part of the numerical simulation. Real-time pressure signals from the PDGs were used to history match the numerical model. Upon completion of the history matching process, different $CO_2$ leakage scenarios were designed and modeled. Since the behavior of the pressure signals (generated due to the modeled leakage) is too complex to be de-convoluted using any existing mathematical formulations, a machine learning-based technology was introduced for this purpose.

Reservoir Model

By way of example, the target $CO_2$ storage discussed in this disclosure is the saline reservoir, located in Citronelle dome (Alabama, US). A twelve-mile pipeline connects Alabama power plant Barry (2,657 MW coal-fired), which is the anthropogenic $CO_2$ source to Denbury's Southeast Citronelle Unit. A post-combustion capture unit, which uses MHI's advanced Amine (KS-1 solvent) process with a capture rate of up to 650 tons per day, became operational at the power plant.

Captured $CO_2$ was planned to be injected at rate of 500 ton per day (for maximum three years) into saline Paluxy sandstones at depths of approximately 9,450 to 10,500 feet (TVD). This inter-bedded shale and sandstone layer is separated by two extensive shale layers from Dantzler sand (saline reservoir) at top and Donovan sand (oil reservoir) at the bottom. Based on well log data from the injection well (D-9-7), 17 sand layers were picked and correlated considering the high resistivity and low SP values. Areal dimensions of some of the thicker sandstones are on the order of 6 square miles or 3,840 acres. The total thickness of sand layers is about 470 feet ranging from 10 to 80 feet. Ten thickest and most extensive sand layers were identified for $CO_2$ injection. Note that Citronelle anticline provides structural closure to saline reservoir in the Paluxy formation.

A reservoir model was developed using a commercial numerical reservoir simulator using the results obtained by interpreting geophysical well logs. The geological model of the Paluxy formation includes 51 simulation layers. This model was divided into 50*50*51 Cartesian grids ($\Delta x$ and $\Delta y$ equal to 400 ft; local grid refinement was applied around the injection well). Based on an initial core study (taken from injection well), constant values for porosity and permeability were assigned to each layer. The table in FIG. 1 lists the porosity and permeability values for different layers in the Citronelle reservoir simulation model. Relative permeability curves were taken from an injection pilot at the Mississippi Test Site. The temperature of the reservoir is 230° F. The brine salinity and density values are 100,000 ppm and 62 $lb/ft^3$, respectively. The pressure reference in this model is 4,393 psi at 9,415 feet (TVD). This values can be modified during history matching process.

In the Citronelle saline reservoir model, two operational constraints were considered for the injection well (D-9-7), namely: injection rate and maximum bottom-hole pressure. The maximum injection rate was set to be 9.45 MMscf/day. Injection started at the beginning of year 2012 and lasted for 3 years. The maximum bottom-hole pressure limit was set to be 6,300 psi. Initial reservoir simulation runs showed that the maximum extension of the $CO_2$ plume takes place in the first (top) layer. This may be attributed to the fact that the top layer represents sand with a higher permeability that causes $CO_2$ to migrate further from the injection well. Referring to FIG. 2, shown on the left is a top view illustrating an example of the plume extension in the first layer and on the right is a perspective view of an example of all layers, 25 years after injection. As it is shown in FIG. 2, the approximate diameter of the plume area in the first layer reaches to 3900 feet, 25 years after the injection has stopped.

$CO_2$ Leakage Modeling

Typically, there are three main sources for the leakage in $CO_2$ storage reservoirs (or gas storage sites): faults, wells, and high permeability zones. Based on the geological study, no fault exists in the vicinity of the $CO_2$ injection well. However, there are different types of wells in area of review (12 oil producers, 5 water injection and 17 abandoned wells) that could be a pathway for $CO_2$ leakage, if they do not represent proper integrity mainly due to poor cementing, casing failure, and abandonment failure. Based on the plume extension, some of these wells can be surrounded by $CO_2$ and consequently prone to leakage. In order to verify the safety of $CO_2$ storage in Citronelle saline reservoir, different monitoring methods were used: near-surface and deep reservoir fluid sampling, in-zone and above-zone pressure and temperature monitoring, cased-hole neutron logging, crosswell seismic and VSP, and surface soil flux and tracer surveys. The data that were gathered by the monitoring process can also be used to history match and update the reservoir simulation models.

Figure 3A:
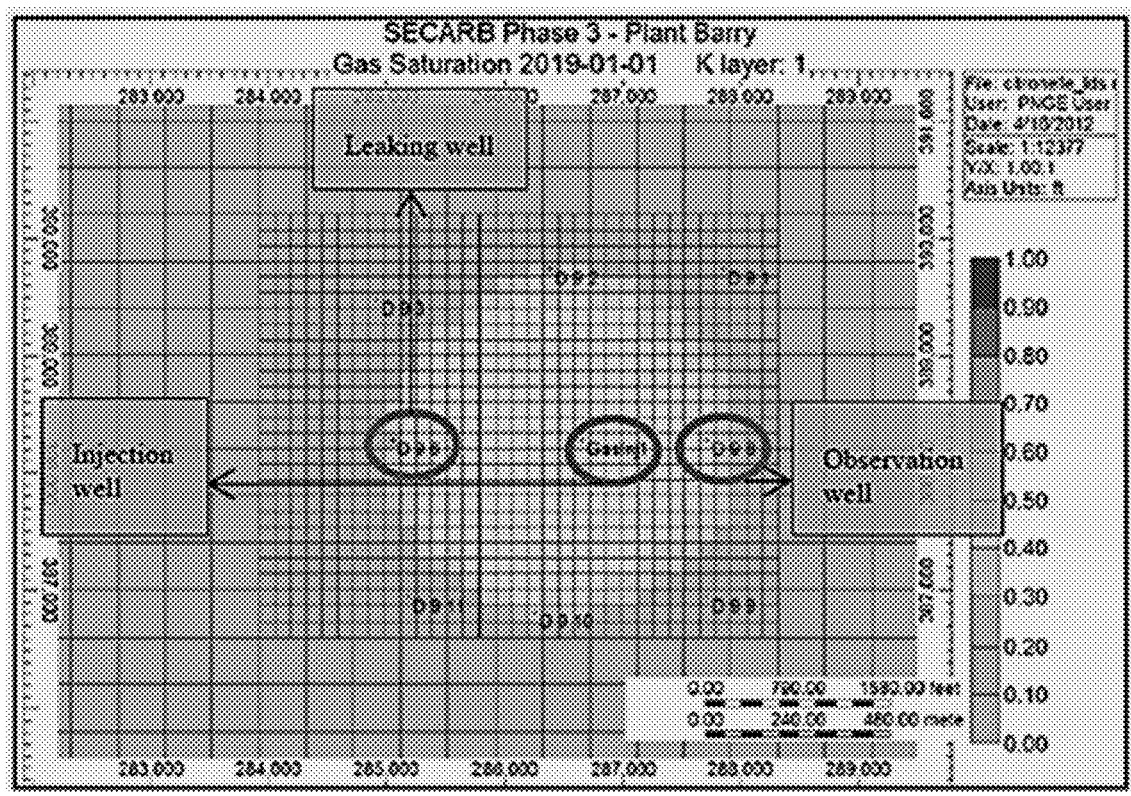
FIG. 3A is a plot illustrating an example of injection well and observation well locations in an area of interest of the reservoir in accordance with various embodiments of the present disclosure.
Figure 3B:
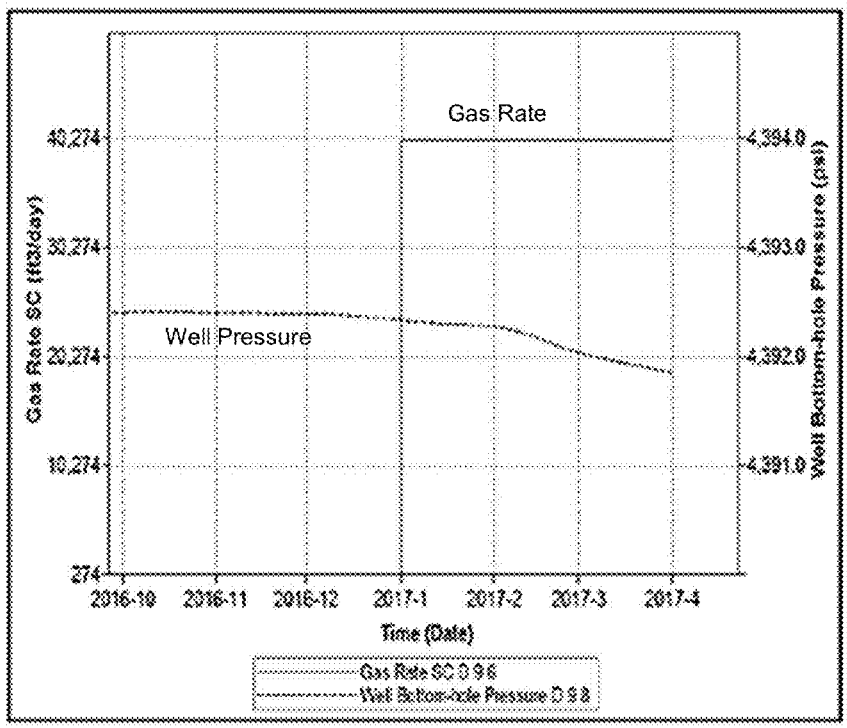
FIG. 3B is an example of pressure behavior in an observation well in accordance with various embodiments of the present disclosure.

For in zone pressure monitoring, PDGs were installed in the observation well D-9-8. In order to study the pressure behavior in the observation well, several $CO_2$ leakage rates (in a simulation model) were assigned to the wells that are located in the area of review. FIG. 3A shows a plot illustrating the locations of the injection well and observation wells in the area of interest. An example of the pressure behavior in the observation well when $CO_2$ leakage rate was equal to 40 Mcf/day at well D-9-6 is illustrated in FIG. 3B. Note that from the beginning of the $CO_2$ injection until its end, the reservoir pressure increased proportionally to the amount of injection and reached a maximum value at the end of injection period. When the $CO_2$ injection stopped, there was a transition time during which the reservoir pressure decreased until the brine and injected $CO_2$ settled into semi-equilibrium. At the end of the transition time, the reservoir pressure remained almost constant (or decreased very slowly), which may be referred to a steady state period. Assuming that $CO_2$ leakage occurs during the steady pressure period (year 2017), a resulting pressure decrease occurs in the observation well as shown in FIG. 3B.

Data Summarization

Interpretation of the PDG data can be challenging due to disturbances like noise and outliers. Normally, data that is transmitted from the PDG sensors can be considered as noisy-high frequency data streams. To begin, the data streams can be processed to remove the noise associated with the data. In this study, a clean pressure signal or the same signal obtained by reservoir simulation model was used. Next, the high frequency PDG data can be summarized and transformed into a format that can be used by the pattern recognition technology. Based on the characteristics of the Δp (pressure change in the reservoir due to leakage) in the high frequency data streams, descriptive statistics can be used over a predefined time window (which can, e.g., vary from half a day to weeks) for data summarization. Descriptive statistics quantitatively designates the key features of a group of data and determines informative extractions about the characteristics of the observations that have been made. The summarized data can form the basis of the initial description of the pressure data that represents the specification of each $CO_2$ leakage scenario and can be used in Neural Network training. Examples of the parameters that may represent and summarize a large amount of data can include: mean, standard error, median, mode, standard deviation, sample variance, kurtosis, skewness, range, maximum, minimum and/or sum.

Intelligent Leakage Detection System (ILDS)

In order to make and develop an intelligent leakage detection system (ILDS) by use of pressure data that is received in high frequency streams from PDGs, a set of simulation runs can provide pressure behavior in the observation well (D-9-8) with respect to leakage rates and locations. The focus was on the different leakage rates that were observed in the real cases all around the world. Different $CO_2$ leakage rates (starting in Jan. 1, 2017) were assigned to wells D 9-6, D 9-2 and D9-10 that are shown in FIG. 3A. First, the pressure in the observation well was obtained in the case with no leakage occurring in the reservoir. When $CO_2$ leakage takes place in one of the wells, it creates a pressure change in the reservoir. This pressure change can be detected in the observation well. Therefore, the difference between pressure in the observation well in the case that no leakage exists and when leakage happens can be considered to be a leakage indicator. ($\Delta P = P_{No\ leak} - P_{Leak}$).

Figure 4A:
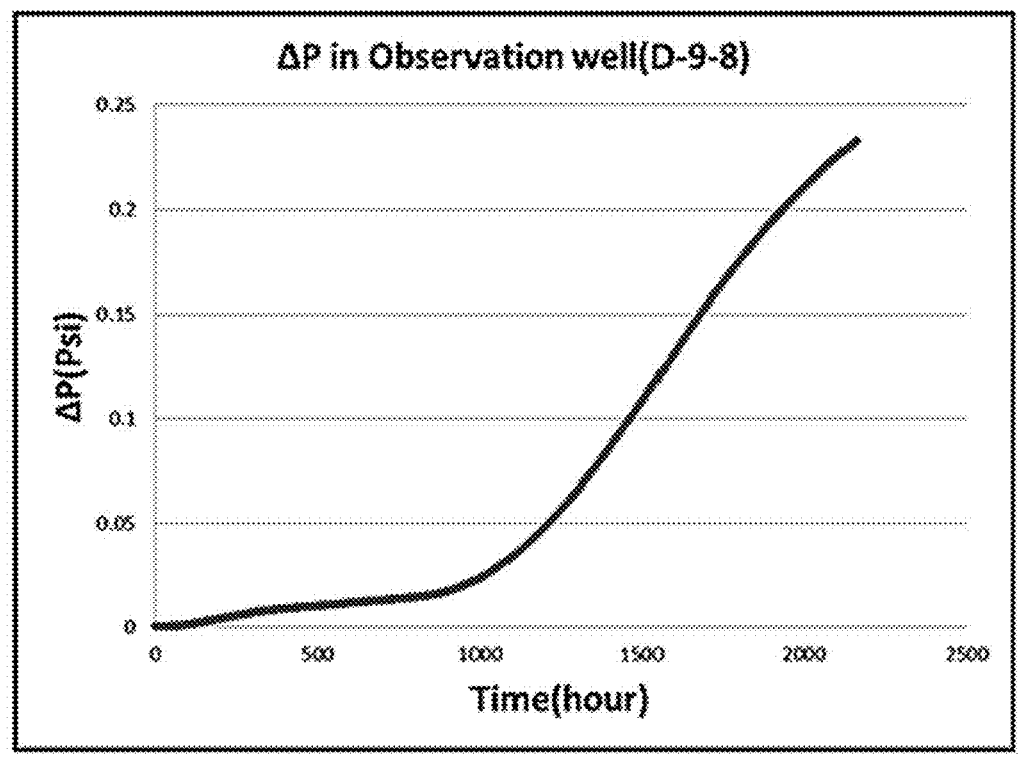
FIG. 4A is an example of $\Delta P$ history in an observation well in accordance with various embodiments of the present disclosure.

This pressure change ($\Delta P$) behavior can be used to characterize the specifications of the leakage, specifically the location and the amount of $CO_2$ seepage. For example, the magnitude of $\Delta P$ can be directly proportional to the $CO_2$ leakage rate. Also, the shape of the $\Delta P$ as a function of time can be related to the location of the leakage. As an illustration, $\Delta P$ history (high frequency-hourly basis) in the observation well, for the case when well D-9-6 leaks with a rate of 30 Mcf/day, is depicted in FIG. 4A. High frequency pressure data in the observation well were obtained based on twenty different $CO_2$ leakage rates (from 15 Mcf/day to 110 Mcf/day with 5 Mcf/day increments) in three different locations (wells D-9-2, D-9-6 and D-9-10). At that point, this data was summarized by descriptive statistics for neural network training.

Figure 4B:
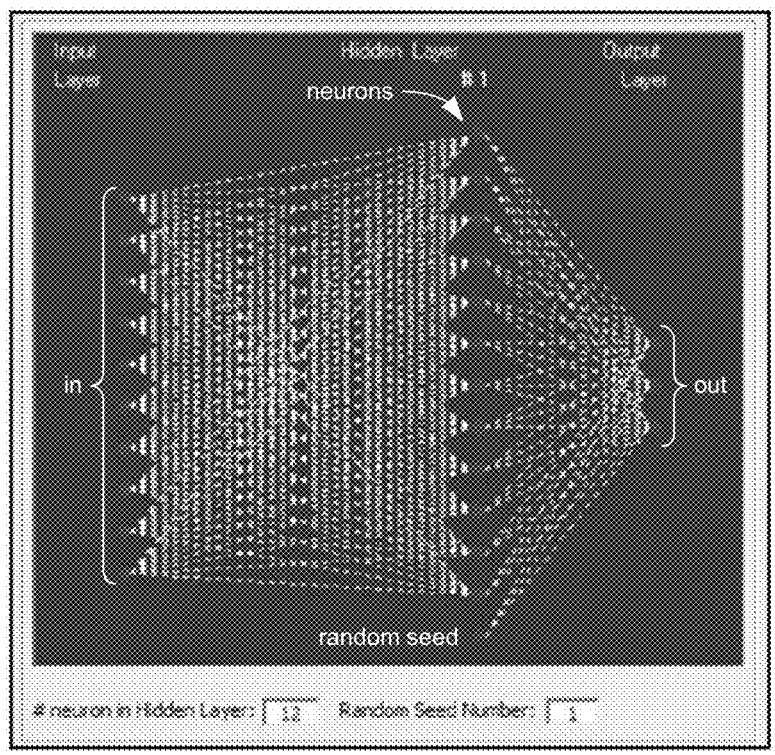
FIG. 4B is an example of a neural network used to determine location of $CO_2$ leakage in the reservoir in accordance with various embodiments of the present disclosure.

In order to determine the leakage location (e.g., latitude and longitude) and leakage rate, the input dataset can include the summarized pressure information from the PDG readings after 1 week of leakage on an hourly basis. Intelligent data partitioning was used for the segmentation of the dataset. 80% of data were allocated for neural network training, 10% for network calibration and 10% for verification. An error back-propagation method was used with 10 inputs (descriptive statistics parameters) and 3 outputs as illustrated in FIG. 4B. The neural network included twelve neurons in one hidden layer and one random seed number.

Figure 5A:
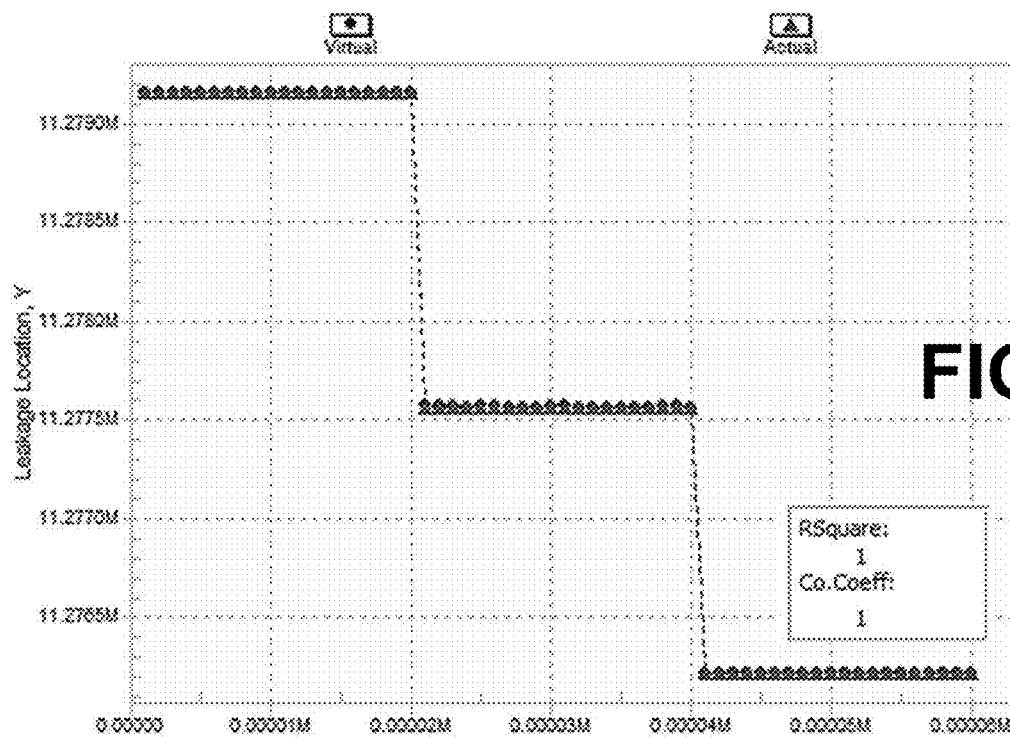
FIGS. 5A-5C are plots of neural network training results in accordance with various embodiments of the present disclosure.
Figure 5B:
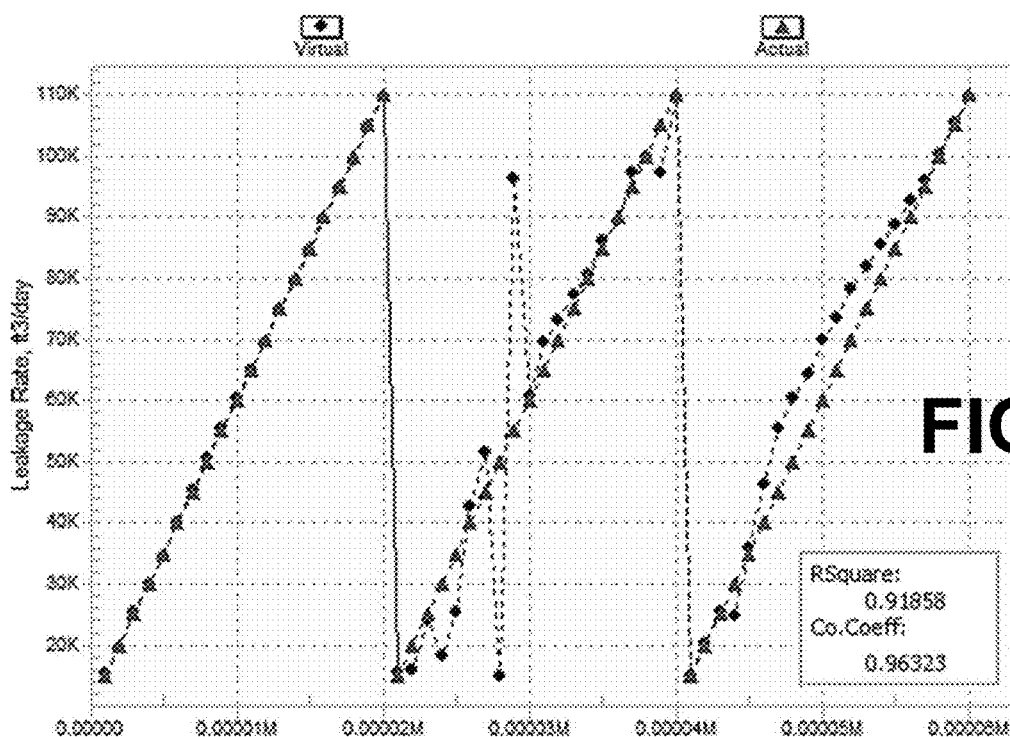
Figure 5C:
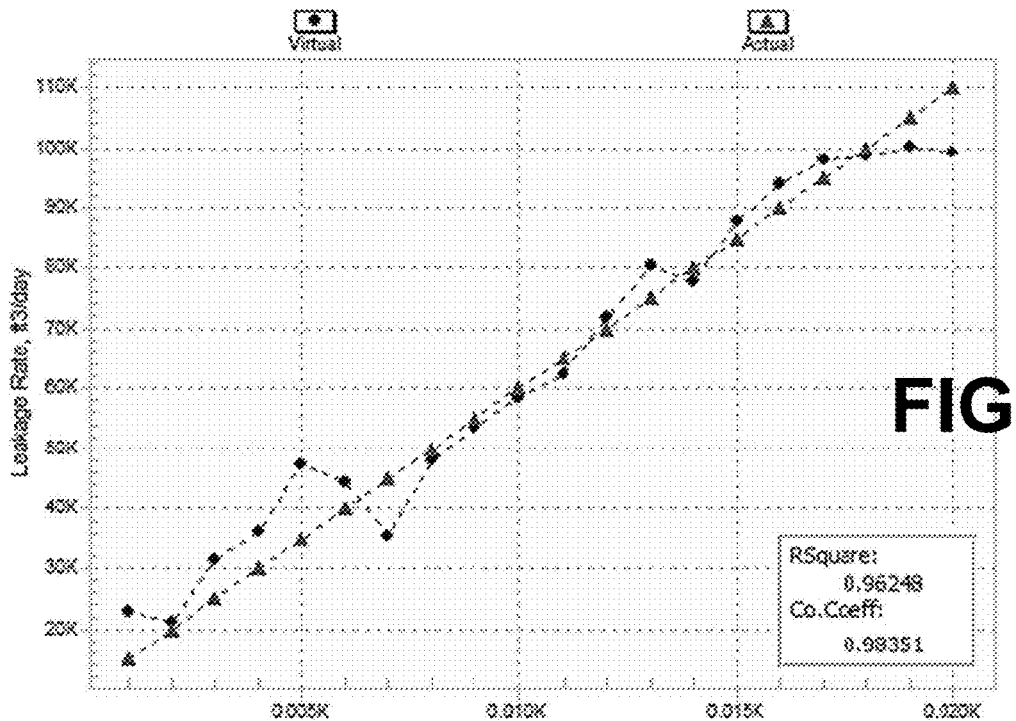

The initial results of the neural network training are illustrated in FIGS. 5A and 5B. FIG. 5A compares the actual leakage locations (latitude) with the corresponding neural network estimations and FIG. 5B compares the actual leakage rates with the corresponding neural network estimations. As shown in FIG. 5A, the neural network quantifies the location of the leaking well with precise accuracy (R-Square=1). However, for the leakage rates of FIG. 5B, the neural network results do not determine a few of the actual data correctly (R-Square=0.92), specifically the rates belonging to well D-9-6. In order to improve the results for $CO_2$ leakage rates estimations, a neural network was developed for each leaking well individually. This approach enhanced the determination performance of the neural network model for the leakage rate. Referring to FIG. 5C, shown is a comparison of the actual leakage rates with the corresponding neural network estimations. As shown in FIG. 5C, the neural network quantifies the location of the leaking well with improved accuracy (R-Square=0.96).

Figure 6:
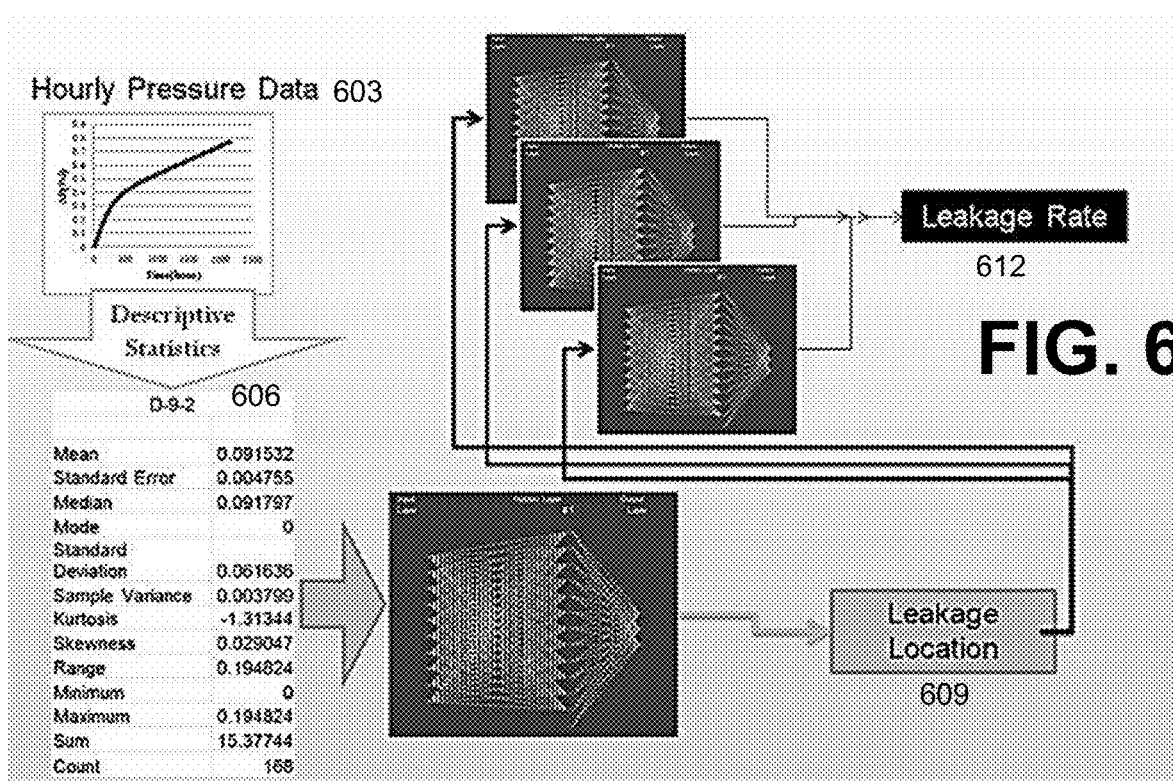
FIG. 6 is a graphical representation of an example of an intelligent leakage detection system (ILDS) in accordance with various embodiments of the present disclosure.

FIG. 6 graphically illustrates the flow of the ILDS. Initially, the high frequency pressure data 603 is acquired (e.g., hourly) and processed to summarize descriptive statistics 606. The descriptive statistics 606 can then be used to determine a leakage location 609. For example, the summarized features of the pressure data are fed to a main neural network that determines the location 609 of the $CO_2$ leakage (or other gas leakage). Based upon the leakage location 609, the leakage rate 612 can then be determined. For instance, some or all of the descriptive statistics 606 and/or the pressure data 603 can be fed into a corresponding neural network that is designed for the specific location 609 that was determined.

Figures 7A, 7B:
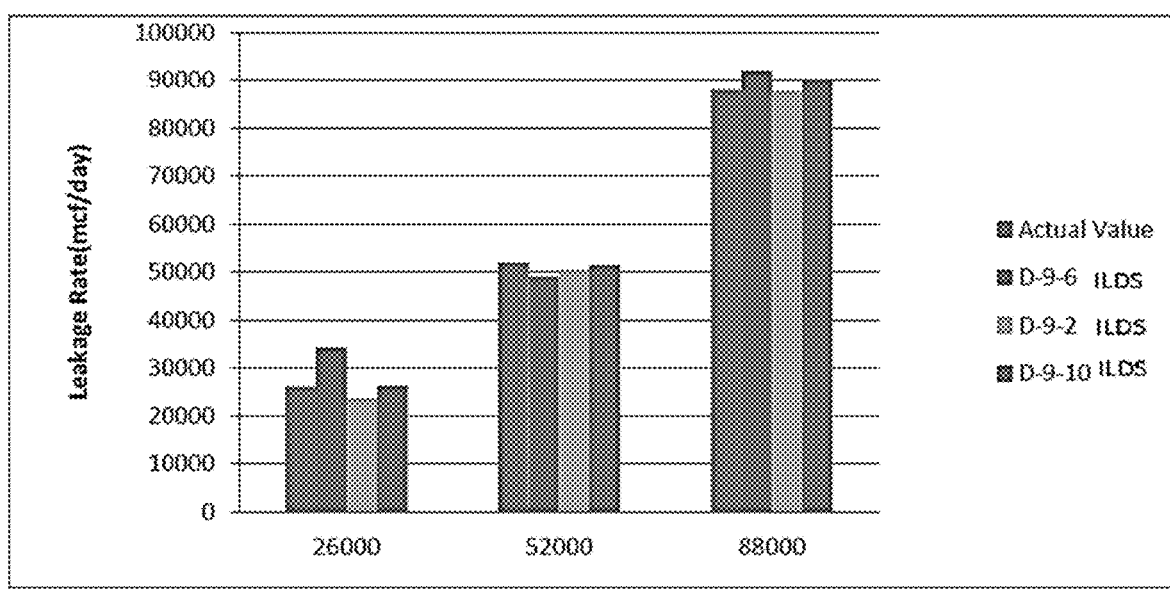
FIGS. 7A and 7B illustrate examples of ILDS estimations for $CO_2$ leakage location and rate in accordance with various embodiments of the present disclosure.

In order to validate the performance of the ILDS, three different $CO_2$ leakage rates not used during training of the neural network (25, 52, and 88 Mcf/day) were assigned to a possible leakage location (wells D-9-2, D-9-6, D-9-10) as blind runs. Pressure data from these runs were summarized by descriptive statistics and fed into ILDS. The ILDS estimations for $CO_2$ leakage location and rate are shown in the table of FIG. 7A and the bar chart of FIG. 7B, respectively. As can be seen from the information of FIG. 7A, the determination of the ILDS for the leakage location is highly accurate in a way that the results are almost the same as actual values. For leakage rate determinations of FIG. 7B, the results are almost as accurate, although the low leakage rates (26 Mcf/day) differ minimally from the actual values but the range of estimated rates is reasonably correct.

The ILDS can take advantage of the data collected using "Smart Field" technology to continuously and autonomously monitor and verify $CO_2$ sequestration (or other gas storage) in geologic formations. The ILDS can provide in-situ detection and quantification of $CO_2$ leakage in the reservoir (or gas leakage in a storage site). The ILDS can identify the location and amount of the $CO_2$ (or other gas) leakage at the reservoir level, long before it reaches the surface. The IDLS can be suitable for detection of leakage under various conditions such as multiple well leakages, leakage in multiple vertical locations in a given well, leakage occurring in the cap rock, availability of additional monitoring wells, the presence of pressure drift, the presence of noise in one or more pressure sensors, and/or uncertainty in the reservoir model.

Figure 8:
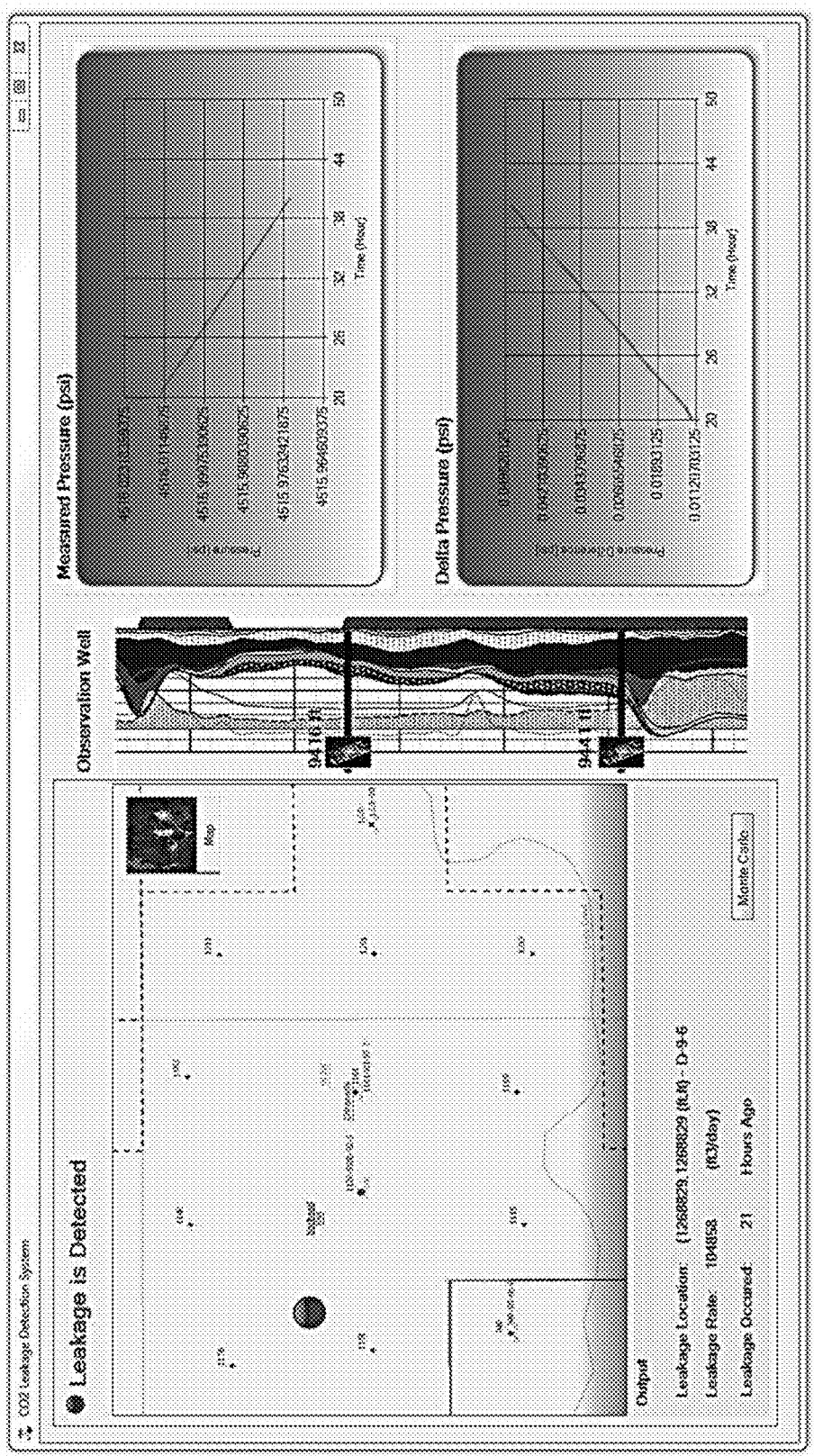
FIG. 8 is an example of a user interface for the ILDS in accordance with various embodiments of the present disclosure.
Figure 9A:
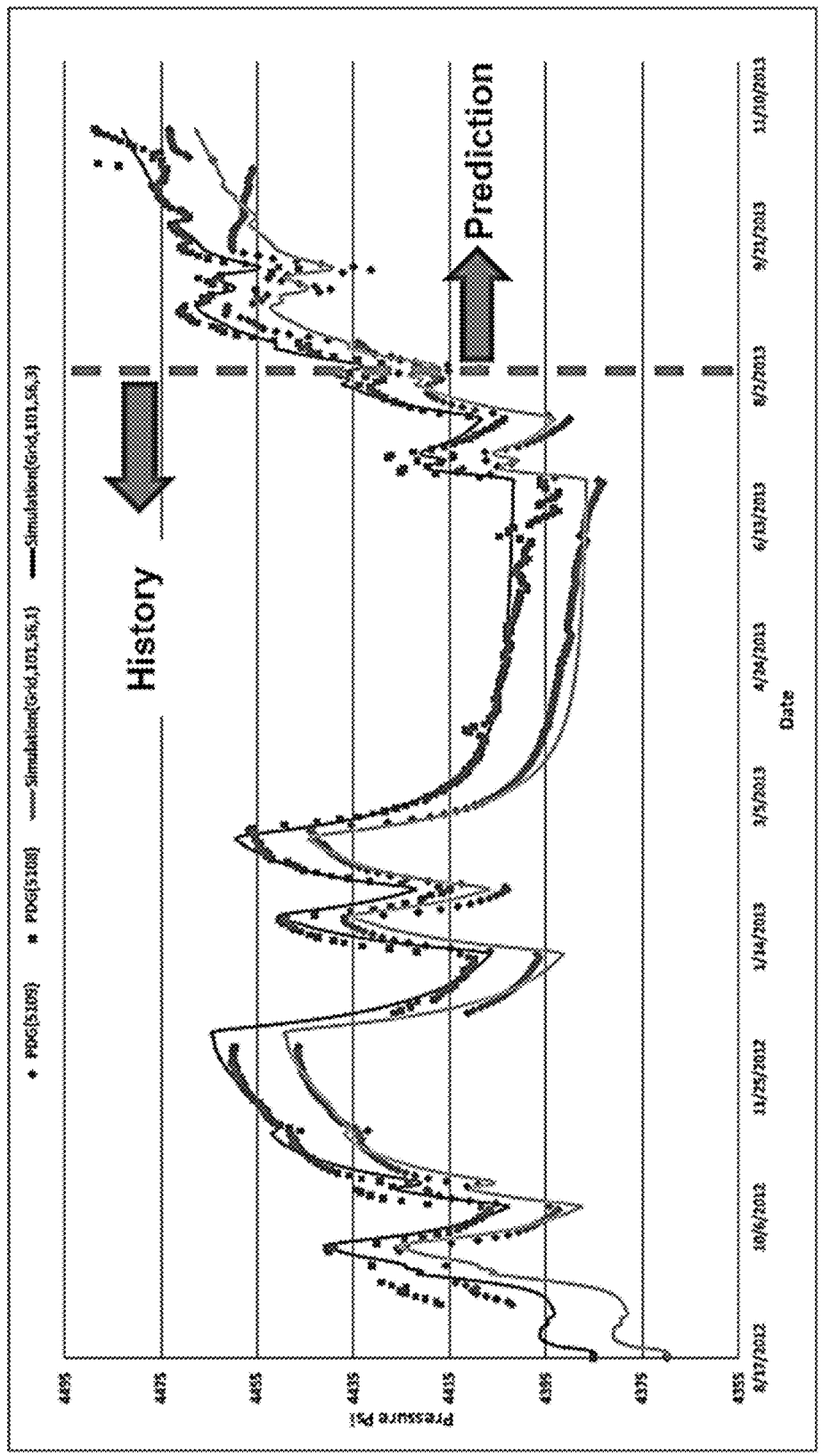
FIGS. 9A-9C illustrate examples of reservoir simulation model validity and estimation performance of the ILDS in accordance with various embodiments of the present disclosure.
Figure 9B:
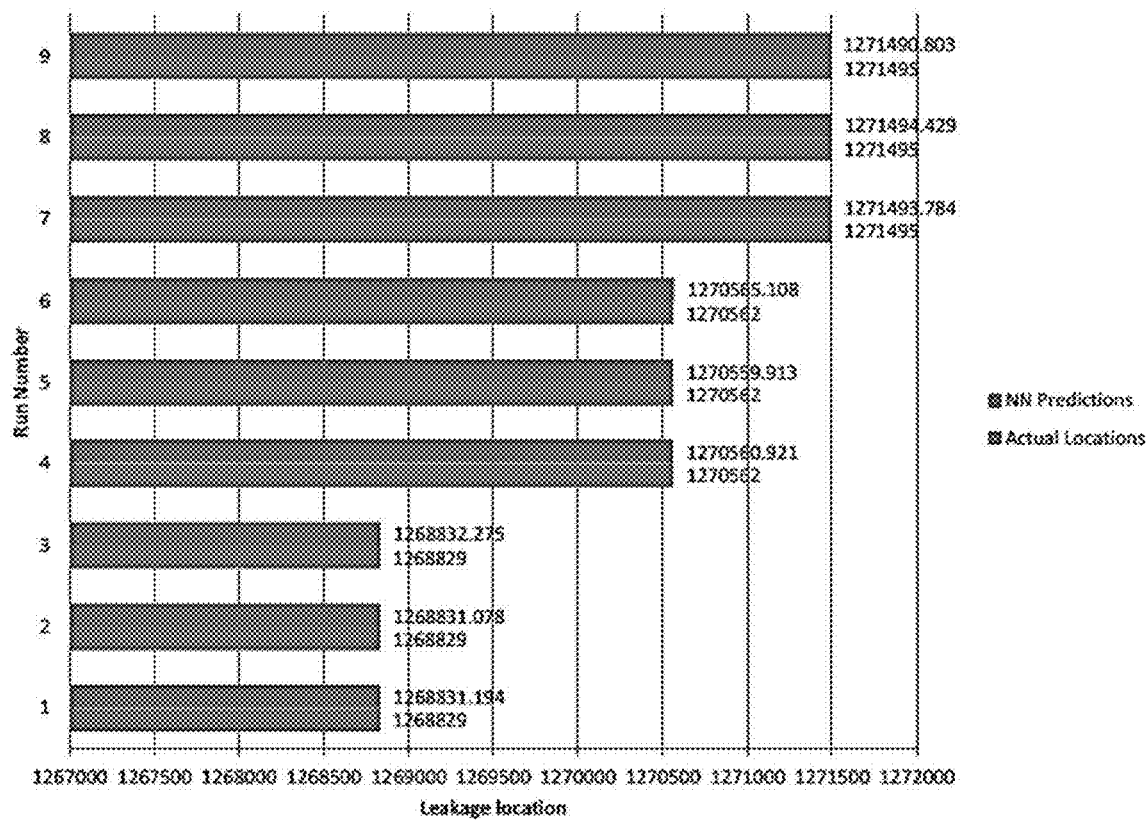
Figure 9C:
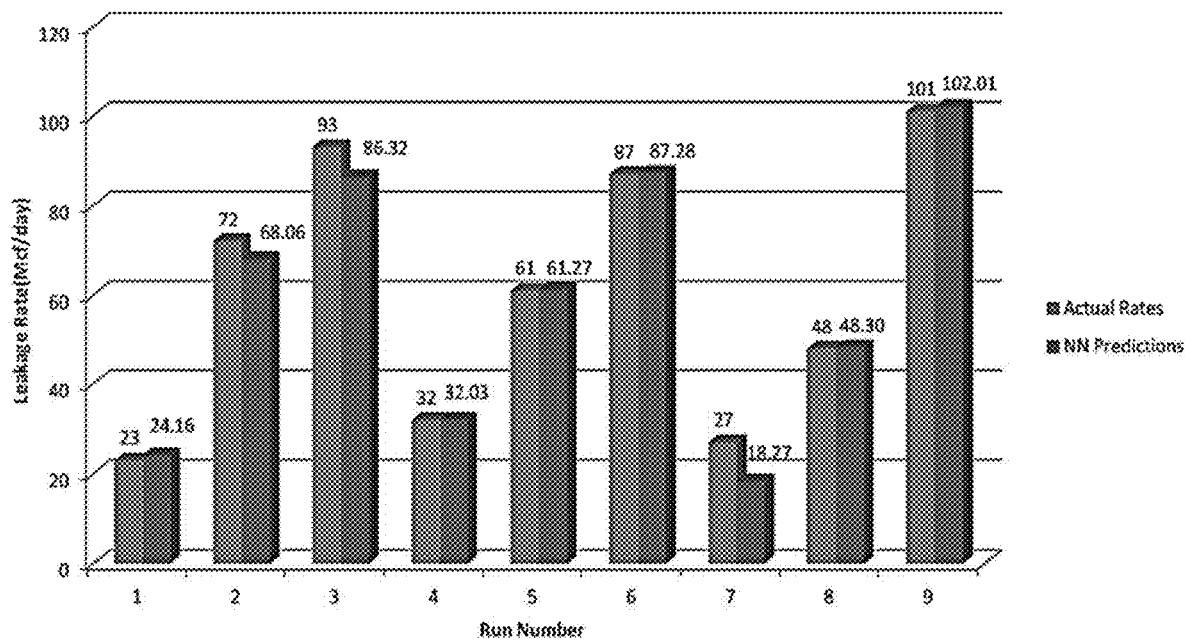

The ILDS utilizes machine learning and pattern recognition technology to provide an indication of leakage from a geologic $CO_2$ (or other gas) storage location. The ILDS can detect leakage characteristics in a short period of time (less than a day from its occurrence) demonstrating the capabilities of the system in locating and quantifying leakage characteristics subject to complex rate behaviors. The ILDS can operate online and perform real-time analysis to provide results through an ILDS interface such as the example illustrated in FIG. 8. Location, pressure, and other leakage information can be provided through the interface. Referring to FIG. 9A, shown is an example of the quality of the history matched model and its capability to estimate (in forecast mode) reservoir performance. FIGS. 9B and 9C graphically illustrate the accuracy that can be achieved using this technology to detect a leak at the reservoir level within hours of the occurrence. As demonstrated by FIGS. 9B and 9C respectively, both the location and the amount of the leakage can be identified using the intelligent leakage detection system (ILDS).

Real-Time Intelligent Leakage Detection System (RT-ILDS)

A real-time intelligent leakage detection system (RT-ILDS) is a data driven monitoring package which receives real time pressure data and determines the occurrence of $CO_2$ (or other gas) leakage, and consequently estimates the location and amount of the leakage. This system originally was designed to receive pressure signals for a time interval, for example, one week of hourly signals—168 records after the leakage. Summarized pressure data obtained by descriptive statistics can be fed into trained neural networks to find leakage characteristics. In RT-ILDS, the pressure data can be analyzed in real-time considering the previous trend of the signals. By this method it is possible to determine leakage characteristics in less than a day.

In order to process the data and convert it to a format which is appropriate for the pattern recognition technology, pressure signals based on thirty different $CO_2$ leakage scenarios were used. Each scenario corresponded to a simulation run that modeled a specific $CO_2$ leakage rate (ranging from 15 to 105 Mcf/day with 10 Mcf/day increments) at one of the three leakage locations (wells D-9-6, D-9-7, and D-9-8). The specifications of the simulation runs and behavior of the pressure signal for each scenario was similar to those covered previously. The only difference is that heterogeneous and history matched reservoir simulation model (FIG. 9A) was used to generate each leakage scenario.

A threshold was assigned as 0.01 psi for the $\Delta P$ that is defined as: $(P_{No\ Leakage} - P_{Leakage})$, as the leakage indicator. This threshold is actually equal to the precision of the PDGs that are currently used in the industry and that are currently installed in the observation well D-9-8. When this threshold is achieved, data processing starts by considering values of $\Delta P$, pressure derivative, $\Delta P$ average, $\Delta P$ summation, $\Delta P$ standard deviation, $\Delta P$ skewness, and kurtosis for the past history of the data (in a given window of time—usually an hour). The hourly pressure data for one week for each $CO_2$ leakage scenario were used to generate the data set for the neural network training, calibration and verification. The first 12 hours of the data after beginning of the leakage ($\Delta P > 0.01$ psi) were neglected from the data processing. While the RT-I LDS was presented with respect to $CO_2$ leakage scenarios, it can also be applied to detect leakage of other types of gas from a storage site.

Neural Network Data Preparation

Development of the RT-ILDS was mainly based on the training, calibration and verification of the neural networks that received the pre-processed real-time pressure data for each $CO_2$ leakage scenario as the input and the corresponding leak rate and location as the output. Initially, a neural network was trained to find a pattern between leakage location (output) and the corresponding pre-processed pressure signals. The entire data set for leakage location neural network included 3,527 data records which were partitioned into 2821, 353, and 353 records for training, calibration, and verification, respectively. The training, calibration, and verification can also be utilized for other gas leakage scenarios.

The influence of each input parameter on the output (leakage location) was determined by key performance indicator (KPI) analysis. FIG. 10A shows a listing of KPIs for the leakage location. As it is illustrated in FIG. 10A, skewness (Cum Skewness), standard deviation (Cum ST Dev) and average (Cum Average) of the $\Delta P$ are indicated to have the most impact on the output (leakage location). $\Delta P$ (Delp) and kurtosis (Cum Kurtosis) follow closely behind. FIG. 10B shows a listing of KPIs for the leakage rate at well D-9-8.

It is worth mentioning that descriptive statistics for $\Delta P$ (in FIGS. 10A and 10B) data at each time step is calculated on a cumulative basis after pressure threshold of 0.01 psi (leakage indicator) is observed. For example, at time step 24 (after the pressure threshold was detected), average (Cum Average), summation (Cum Sum), standard deviation (Cum ST Dev), skewness (Cum Skewness) and kurtosis (Cum Kurtosis) were calculated for 24 $\Delta P$ records (cumulative). Derivative and $\Delta P$ (Delp) are point values at time step 24. The last 12 data records and corresponding calculated parameters will be used in neural network training.

For leakage rate determination, one neural network was trained for each well separately. The number of input data records for each well is different due to implementing 0.01 psi threshold as the leakage indicator. For instance, 1,553 records were used to train leakage rate neural network for Well D-9-8. Those data records were partitioned into 1243, 155, and 155 records for training, calibration, and verification, respectively. The results for KPI analysis for well D-9-8 which shows the impact of the input parameters on the $CO_2$ leakage rate are shown in FIG. 10B.

The neural network training process attempts to calculate the most proper weights that describe a pattern between the leakage locations and the specified input data (pressure signals). The entire process included a number of epochs that attempt to minimize the error between actual and estimated results.

Figure 11A:
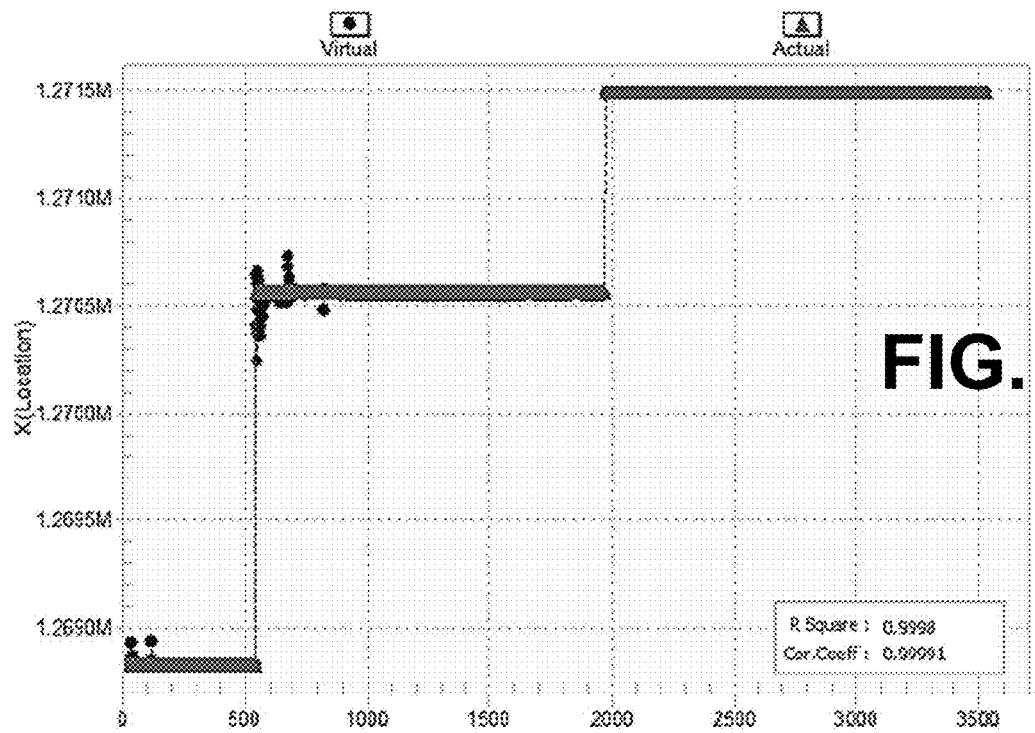
FIGS. 11A and 11B are plots of neural network training results in accordance with various embodiments of the present disclosure.

The training process was calibrated by looking over the training results and finding the best training outcomes. When the error in the calibration reached a minimum value (or threshold), the training process was stopped and the training process was identified as completed. The results for all the training processes (training, calibration, and validation) are shown in FIG. 11A ($CO_2$ leakage location) and FIG. 11B ($CO_2$ leakage rate in well D-9-8). For both the leakage location and results, R-square was more than 0.99, which represents high precision.

To validate the performance of the RT-ILDS, a set of blind runs based on data not used for the neural network training were designed, the simulation runs were performed and the appropriate data was collected and pre-processed to an appropriate format for application to the neural network models. Nine simulation runs were performed considering assignment of three $CO_2$ leakage rates at the possible locations of the leakage (wells: D-9-6, D-9-7, and D-9-8). Pressure signals which corresponded to each $CO_2$ leakage scenario were processed by applying the leakage threshold (0.01 psi) and generating $\Delta P$, pressure derivative, $\Delta P$ average, $\Delta P$ summation, $\Delta P$ standard deviation, $\Delta P$ skewness, and $\Delta P$ kurtosis at each time step.

Figure 11B:
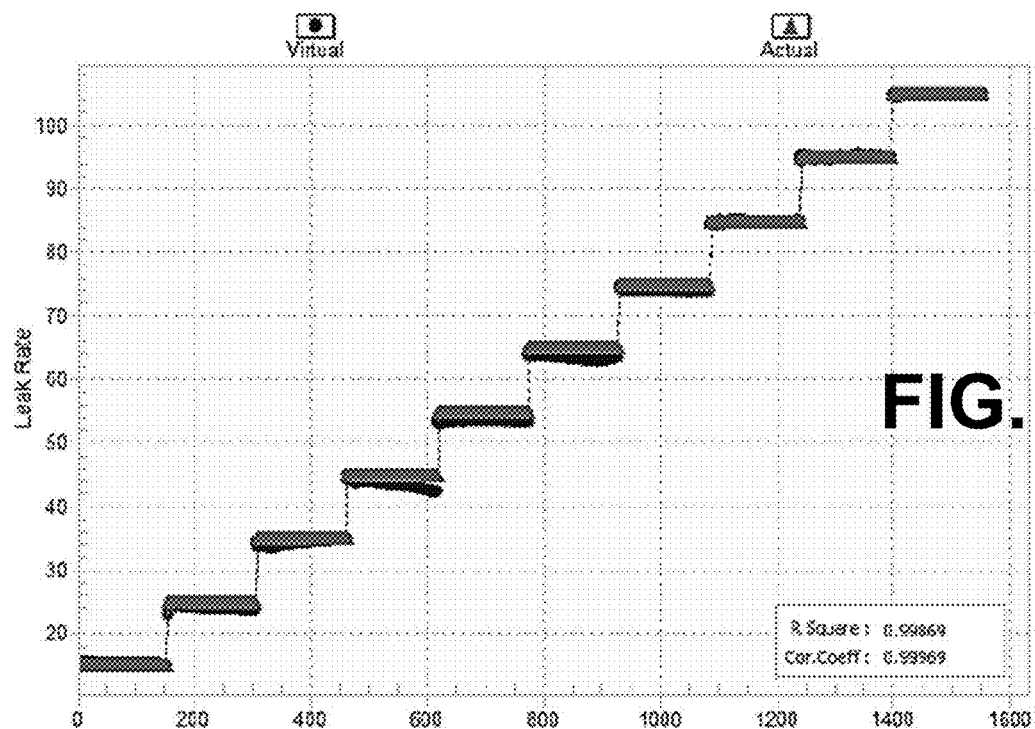
Figure 12A:
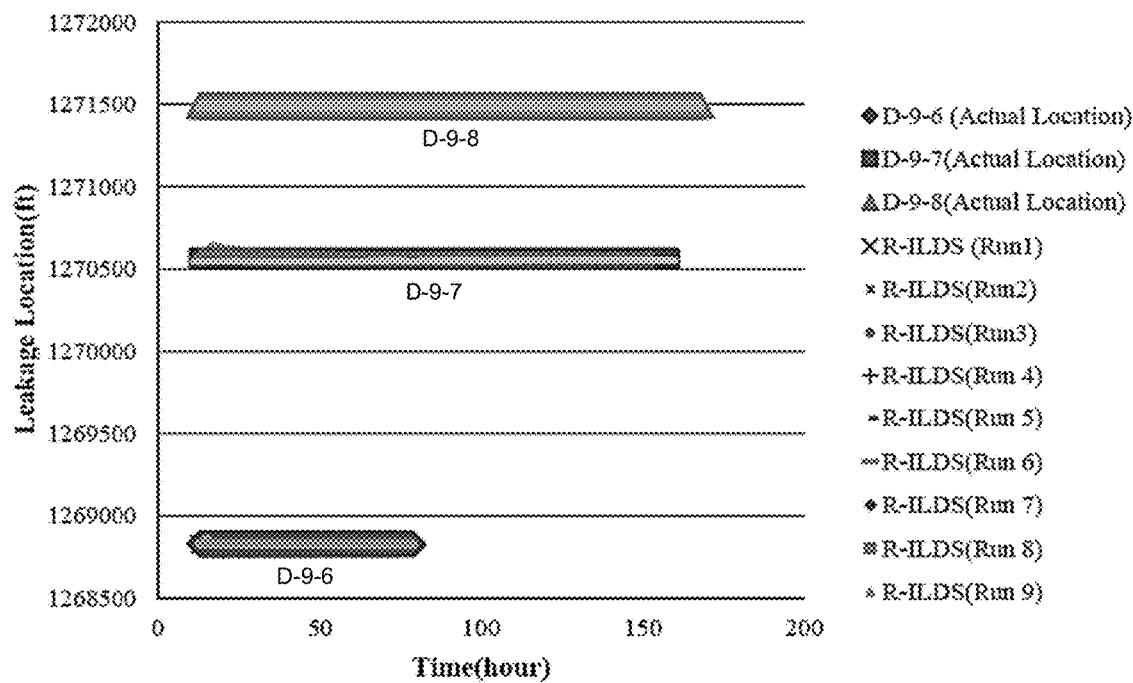
FIGS. 12A and 12B are plots illustrating estimated leakage location and leakage rate in accordance with various embodiments of the present disclosure.
Figure 12B:
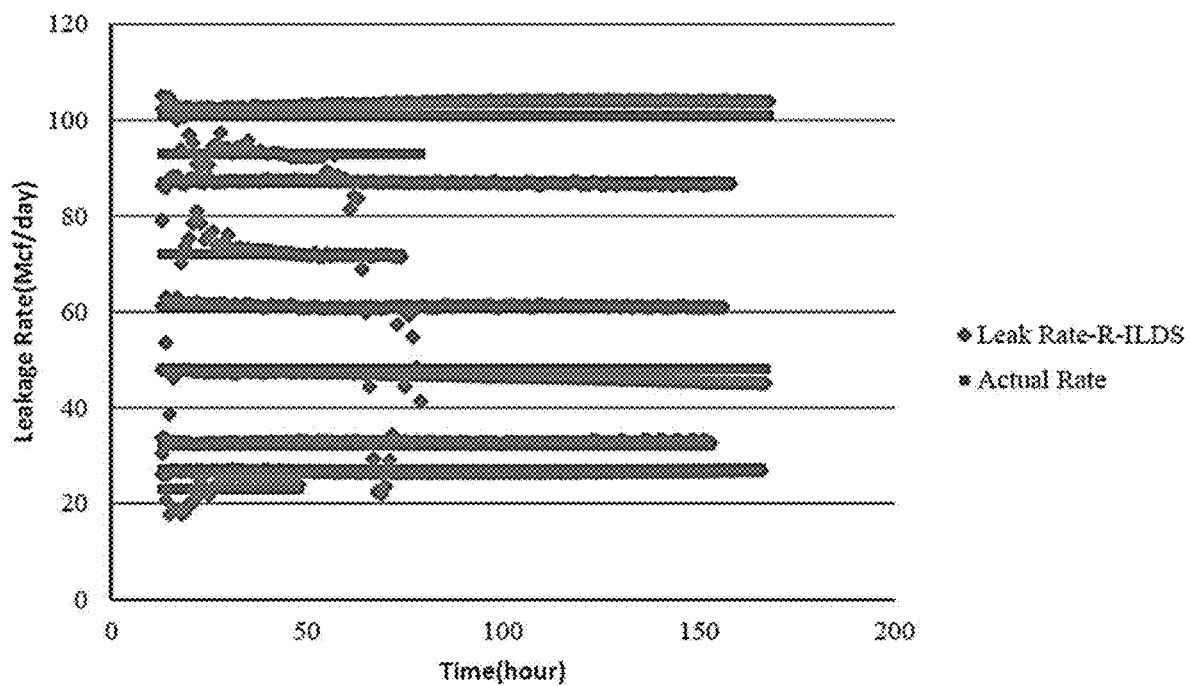

For each leakage scenario, all the calculated parameters were fed to the RT-ILDS to get the indication of the leakage location and leakage rate. All the results for RT-ILDS determination for each blind run are shown in FIGS. 11A and 11B. FIG. 11A shows the neural network results for the leakage location and FIG. 11B shows the neural network results for the leakage rate of well D-9-8. The estimated leakage location and leakage rate for all of the blind runs are summarized in the plots of FIGS. 12A and 12B, respectively.

Figure 13A:
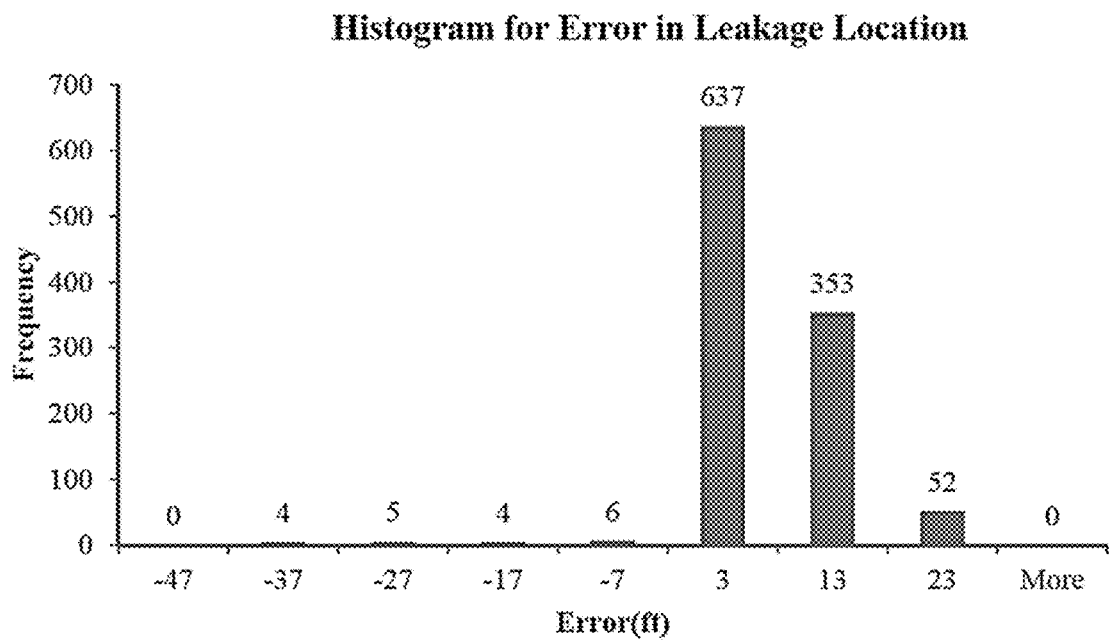
FIGS. 13A and 13B are examples of neural network estimation error for leakage location and leakage rate in accordance with various embodiments of the present disclosure.
Figure 13B:
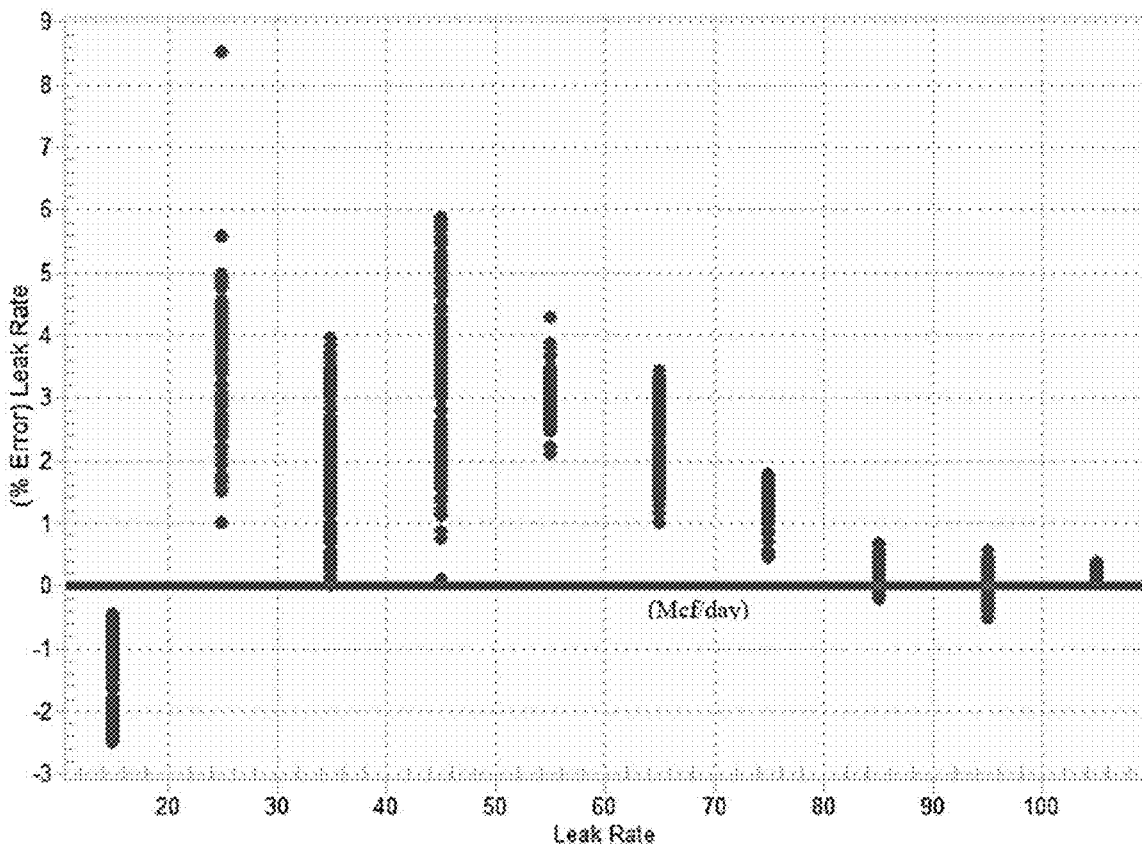

The precision of the neural network estimations can be quantified by the $R^2$ parameter and the distribution of the errors. The neural network that was trained for leakage location has an $R^2$ valuethat is practically equal to 1. The estimation error histogram for the neural network's estimated locations of the wells is shown in FIG. 13A. The average error for the leakage location was 3 ft. with the maximum error of 46 ft. The $R^2$ for the $CO_2$ leakage rate estimations is 0.998, which represents good precision. The percentage error plot for the neural network estimated leakage rate at well D-9-8 is shown in FIG. 13B. The maximum error for the leakage rate was less than 9%. The average error for $CO_2$ leakage rate estimations was less than 4% at well D-9-8.

Detection Time

When $CO_2$ leakage occurs in the reservoir (e.g., from existing wells D-9-6, D-9-7, and/or D-9-8), there is a delay before the PDGs receive the generated pressure signal. The time that takes to detect $CO_2$ leakage depends on the PDG resolution and the amplitude of the pressure signals. The resolution of the PDGs that were installed in observation well is 0.01 psi. Therefore, if the amplitude of a change in the induced pressure signal due to $CO_2$ leakage is less than the PDG resolution, the leak will not be detected.

Figure 14A:
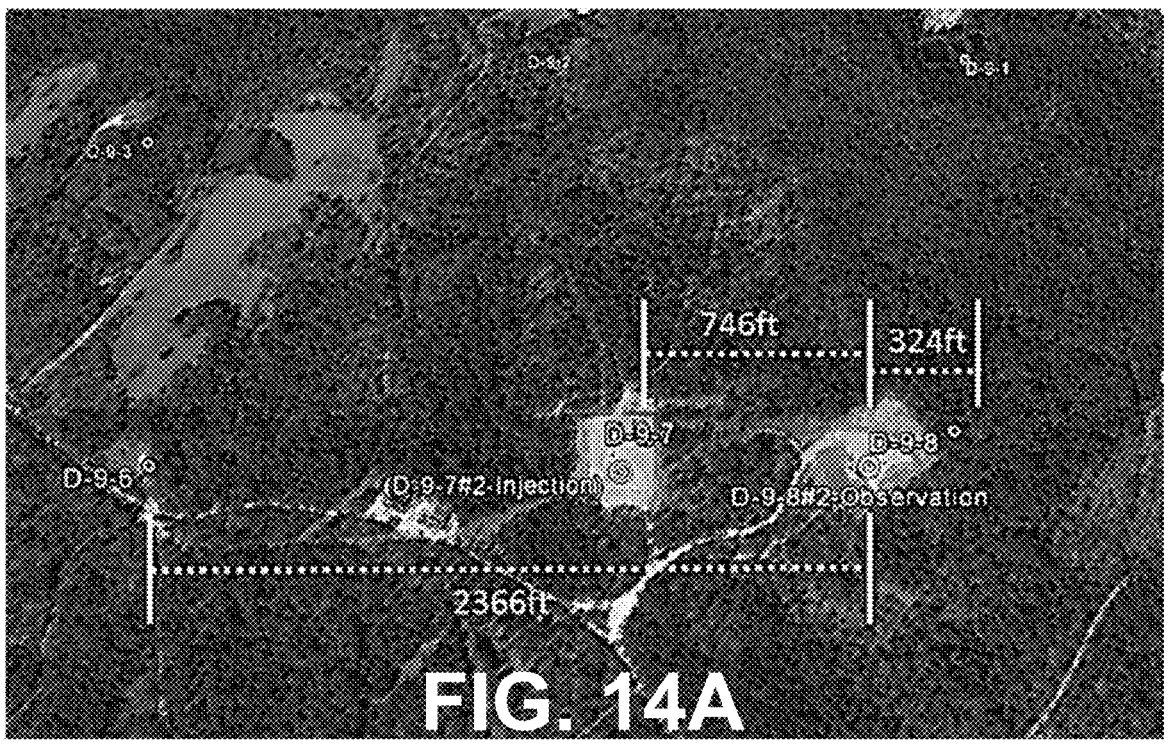
FIGS. 14A-14C illustrate detection of leakage location in accordance with various embodiments of the present disclosure.

Another parameter related to leakage detection timing is the amplitude of the pressure signal. The signal amplitude is inversely proportional to the distance from the location of the leak to the location of the observation well. The distances from the possible leakage locations at wells D-9-6, D-9-7, and D-9-8 to the observation well are shown in the FIG. 14A. Note that the distance, as far as the transmission of the pressure transients are concerned, includes the impact of the permeability as well as the physical distance between two points. Furthermore, the accuracy of the permeability distribution is a function of the accuracy of the history matching process.

Figure 14B:
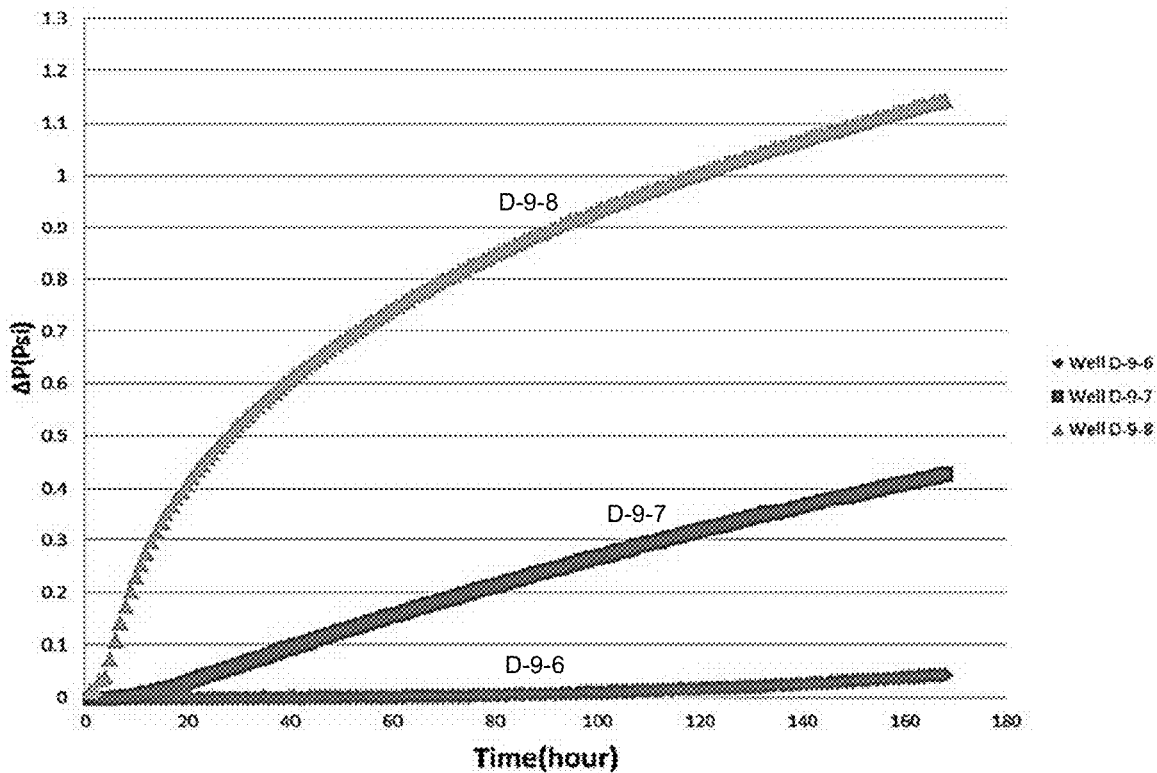

The induced pressure signal (as a result of leakage in the reservoir) for each of the cases where the three wells leaked at the same rate of 55 Mcf/day is shown in 14B. As the leakage location gets closer to observation well, the amplitude of the pressure signal increases as shown in FIG. 14B. RT-I LDS monitors pressure changes by PDGs with sensitivity of 0.01 psi. Also, the first 12 pressure data records (after detecting a change of $\Delta P$=0.01 psi) were not included in RT-I LDS development. The analysis results can be improved by ignoring the first 12 pressure data records after the threshold level has been reached and/or exceeded. Based on the mentioned criteria, detection times for different $CO_2$ leakage rates at each leakage location were plotted in FIG. 14C. As the distance between the leakage well and the observation well decreases, the pressure signal amplitudes increase and it takes less time to detect the leakage and provide valid results.

Testing RT-ILDS for Multiple Geological Realization

The reservoir simulation model for $CO_2$ injection at the Citronelle saline aquifer was developed and history matched with real field data. The model acknowledged "lateral heterogeneity" in different ways. The first reservoir characteristics that played a role in making the reservoir model heterogeneous included the top of sand layers. Structural maps for 17 sand layers (the most extensive ones that were targeted for $CO_2$ injection) were generated by interpretation and correlation of 14 well logs. Based on correlation between wells, 17 top maps were generated representing lateral heterogeneity in the reservoir. Storage simulation models can be developed for other gases in a similar manner.

The same well logs were used to generate thickness (isopach) maps for all the layers. In order to make porosity maps, 40 well logs were analyzed and interpreted. Three different porosity maps were generated for each sand layer (with 51 total porosity maps for the entire reservoir). In this model, permeability of the reservoir was obtained using porosity-permeability correlations from core analysis. This means that there are lateral heterogeneities for the permeability as well.

Figures 14C, 15:
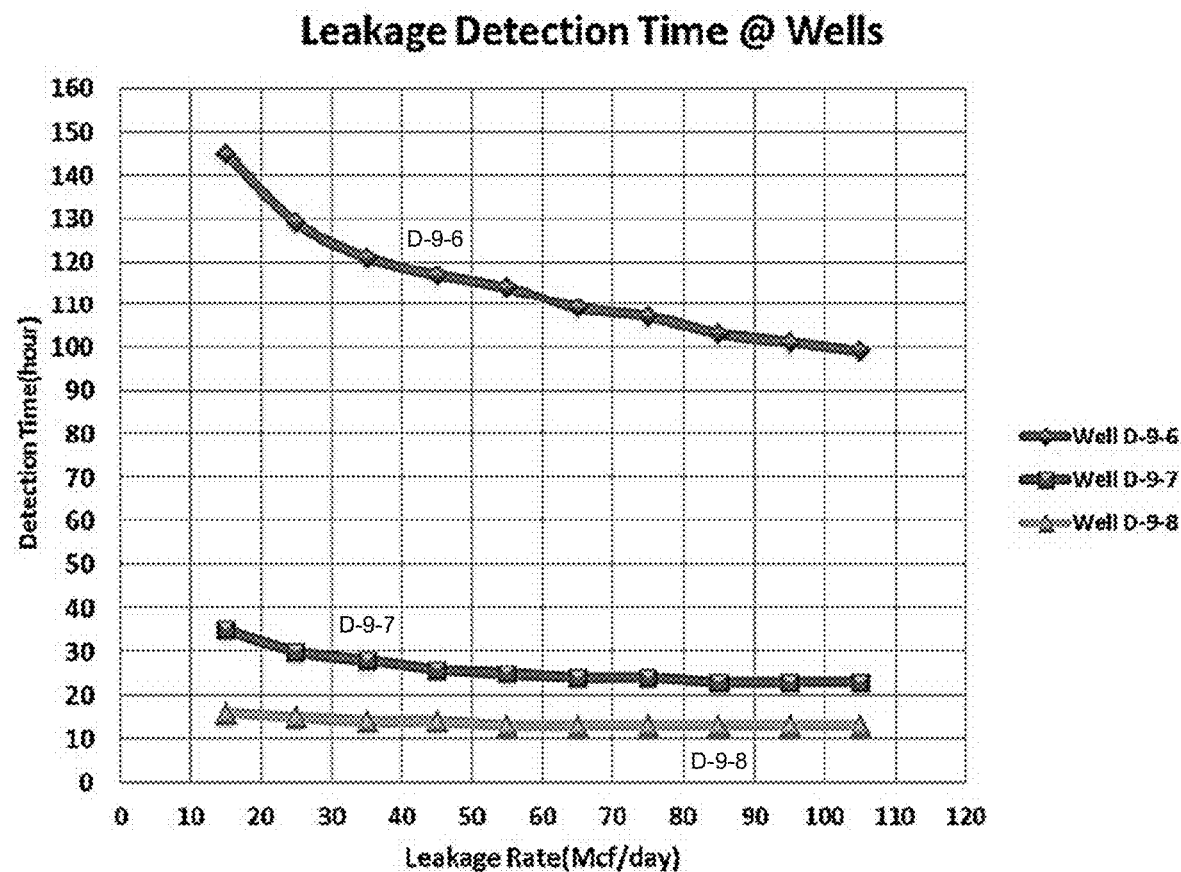
FIG. 15 is a table illustrating parameter variation for testing in accordance with various embodiments of the present disclosure.

Multiple reservoir characteristic realizations were generated aimed at changing the parameters that control lateral heterogeneity in the reservoir. Reservoir porosity, sand layer top/thickness and vertical to horizontal permeability ratio were the main parameters to be modified for generating lateral heterogeneity realizations. All these parameters were varied with respect to the original values as illustrated in the table of FIG. 15. For each realization, leakage rates equal to 70, 60 and 50 Mcf/day were assigned to wells D-9-6, D-9-7, and D-9-8, respectively.

The corresponding pressure signals (due to leakage from the wells) at the observation well, were collected, processed and fed to the RT-ILDS. It should be mentioned that after changing reservoir characteristics (e.g., like porosity or thickness), initial reservoir pressure and stabilization pressure after end of injection varied (e.g., compare with the initial history matched model). This meant that $P_{no\ leakage}$ and consequently $\Delta P$ had to be recalibrated and recalculated.

Figure 16:
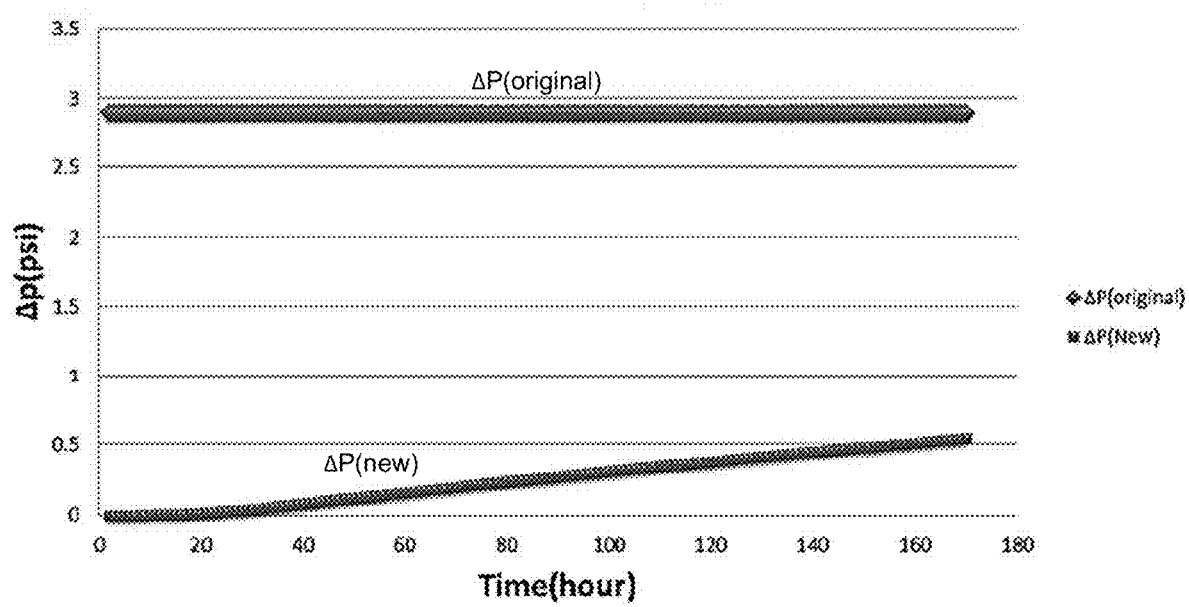
FIG. 16 is a plot illustrating leakage rate estimation (using pressure change a different depths) in accordance with various embodiments of the present disclosure.

To recalibrate and recalculate the $\Delta P$, a "no leakage" scenario was modeled and the relevant data was extracted for each realization. Reservoir pressure signals at the observation well were also collected for each realization. At this point, new $\Delta P$ values were calculated for each realization, having no leakage pressure data for all the cases. FIG. 16 illustrates an example of $\Delta P$(original) and $\Delta P$(new) for the realization with porosity of the reservoir lowered 10% and $CO_2$ leakage rate equal to 60 Mcf/day was assigned to well D-9-7. Pressure signals from different $CO_2$ leakage rate scenarios and reservoir characteristic realizations were collected, processed and fed into the RT-ILDS. Results of all these exercises demonstrated the robustness of the RT-ILDS.

First, the effect of each parameter on the RT-ILDS estimations for the leakage location is considered. When the leakage (at a rate of 70 Mcf/day) took place at well D-9-6, the RT-ILDS determined the location correctly for all realizations except for the case where the reservoir porosity decreased 10%. In that case, RT-I LDS estimation started deviating from the actual value (1,268,829 feet) almost 35 hours after detecting the leakage. The location estimation from that time showed a deviation of 1000 feet from the actual location before gradually moving back to the actual value.

For the case where well D-9-7 leaked (at a rate of 60 Mcf/day), RT-ILDS location estimation exhibited an error of almost 20 feet. In the situation where reservoir porosity decreased 10%, the determined values showed a 20 feet error early after leakage detection before the error for the RT-ILDS location estimation increased to 80 feet. This error was acceptable since the estimated location was still in the vicinity of the target leaking well (D-9-7). When well D-9-8 was leaking with the rate of 50 Mcf/day, changing the reservoir characteristics showed no effect in the RT-ILDS location determination apart from the case where reservoir porosity increased 10%. In that case, RT-ILDS determined the leakage location to be at well D-9-6.

Next, the impact of the model parameters on RT-ILDS's estimation for the leakage rate is considered. The RT-ILDS estimations for $CO_2$ leakage rate at well D-9-6 were almost precise excluding the cases where reservoir porosity varied. The RT-ILDS results for $CO_2$ leakage rate were 105 Mcf/day (with an actual value of 70 Mcf/day) while reservoir porosity was changed ±10%. Once well D-9-7 was leaking, change of main reservoir parameters showed very little impact on the RT-ILDS's results for $CO_2$ leakage rate. The maximum error of 10 Mcf/day in the results may be attributed to decreasing the reservoir porosity 10%. Note that the $CO_2$ leakage rate for this well was 60 Mcf/day.

Finally, for the case where well D-9-8 was leaking 50 Mcf/day, the RT-ILDS results for $CO_2$ leakage rate were consistent with the actual value with the exception of the realizations with a reservoir porosity change. Lowering reservoir porosity 10% led to a RT-ILDS estimation of 15 Mcf/day, while increasing reservoir porosity resulted in a 70 Mcf/day estimation.

All in all, the impact of model specific parameters was studied on the performance of RT-ILDS. For most of the cases, changes in the model parameter did not show significant impact on the RT-ILDS results. The only parameter that considerably impacted RT-ILDS determinations for both $CO_2$ leakage rate and location was the reservoir porosity. In the reservoir simulation model that was developed for $CO_2$ injection at the Citronelle field, the reservoir permeability was calculated by porosity-permeability correlation. Therefore, variation of reservoir porosity indirectly changed reservoir permeability. In other words, any change in reservoir porosity led to a change in the permeability as well. Reservoir permeability plays an important role in fluid flow in the reservoir and consequently affects the pressure signals coming from the observation well. The porosity change caused different fluid flow behavior and consequently different pressure signal behavior. As a result, the RT-ILDS results were impacted by variations in the reservoir porosity.

Detection of Leaks at Different Vertical Locations Along the Wells

Figure 17A:
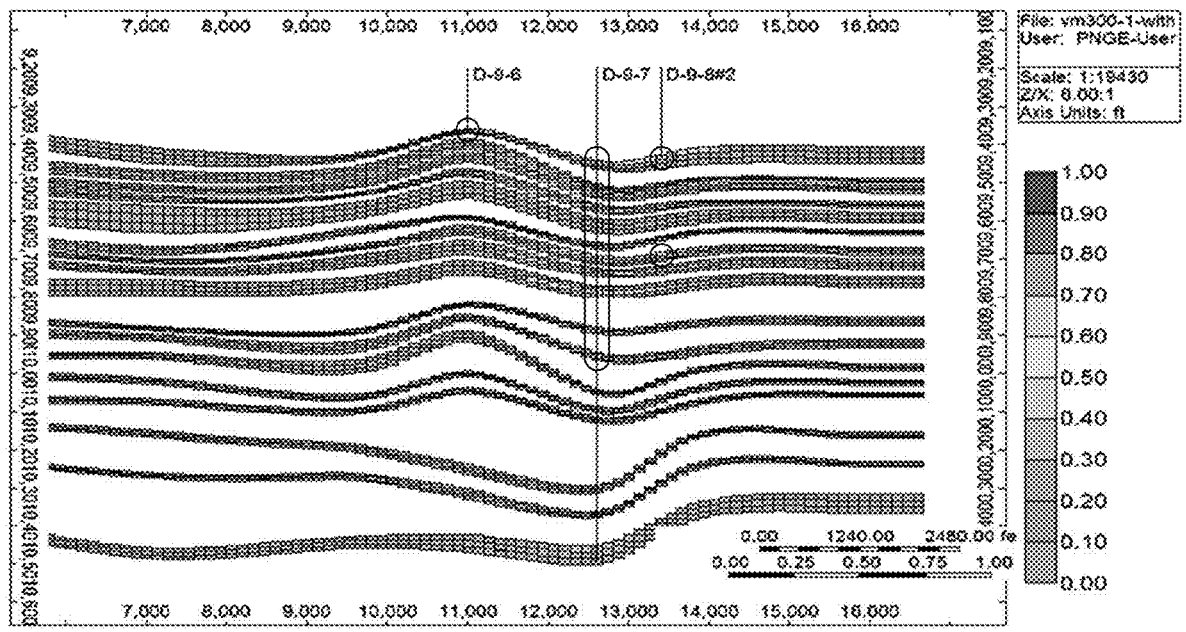
FIGS. 17A-17C illustrate $CO_2$ plume extension and transmissibility multiplier of a reservoir in accordance with various embodiments of the present disclosure.
Figure 17B:
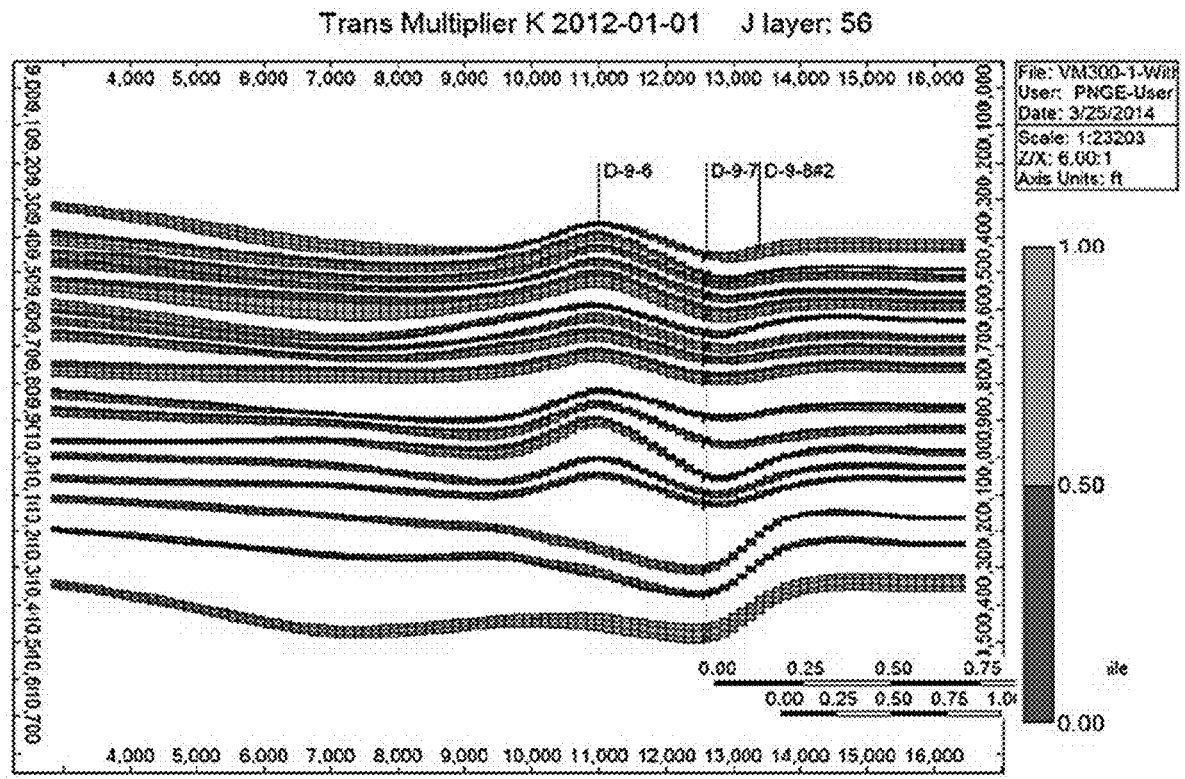

Referring to FIGS. 17A and 17B, shown are plots of $CO_2$ plume extension (gas saturation) and transmissibility multiplier, respectively, for different shale layers in the reservoir simulation. Based on the reservoir simulation results for $CO_2$ distribution and extension of FIG. 17A, it was noted that the $CO_2$ plume reached the existing wells in the reservoir mainly in layer 1. Therefore all the synthetic leakages were assigned to the wells at layer 1 (with the well perforated just in that layer). More investigation showed that $CO_2$ plume was in contact with well D-9-7 through 9 layers and well D-9-8 in two layers. This means that $CO_2$ leakage could take place at different vertical locations along the well D-9-7. For that reason, the changes in the vertical leakage location were applied to investigate if the RT-IDLS was capable of detecting the leak and the rate regardless of the vertical location of the leak within a well.

Figure 17C:
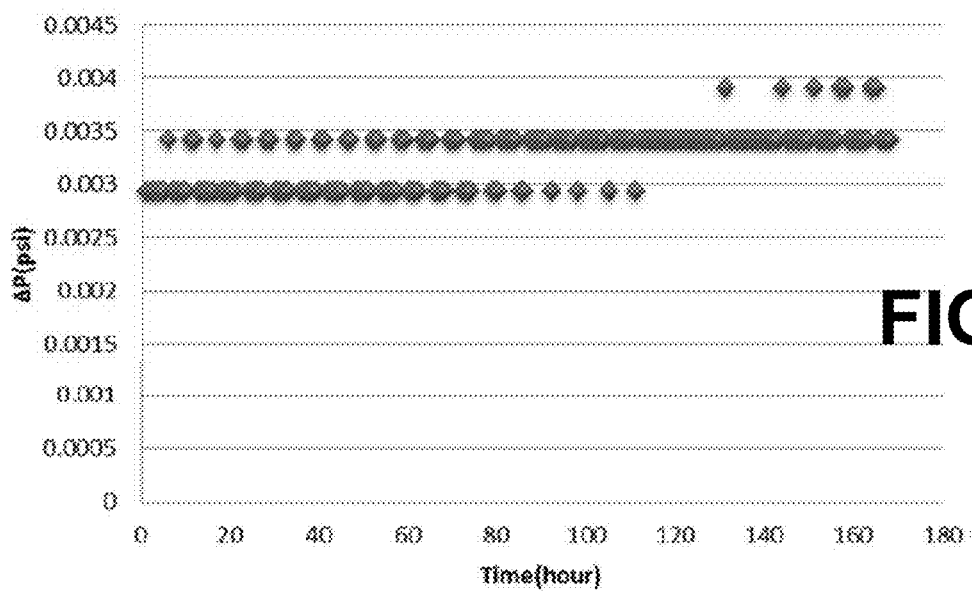

Two PDGs were installed at well D-9-8 in the first layer of the reservoir. During the history matching process, based on the reservoir pressure behavior in the observation well, it was concluded that the transmissibility of the shale layers that are inter-bedded in the sand layers was zero. This resulted in no vertical communication between the sand layers. Therefore, if a leak took place at well D-9-7 in layer 5, it would not be possible to observe the pressure change by sensors located in layer 1. The pressure change observed by a PDG located in well D-9-8 when well D-9-7 was leaking from layer 5 (50 Mcf/day) is shown in FIG. 17C.

Figure 18A:
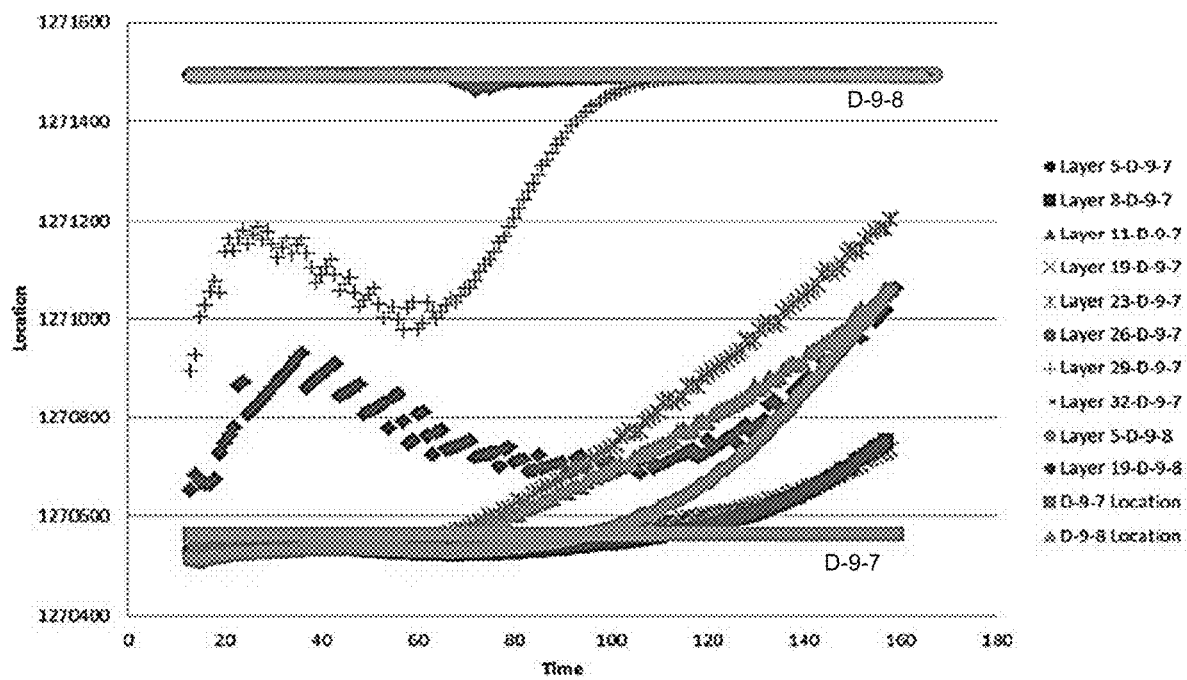
FIGS. 18A-18C are plots illustrating real time ILDS (RT-ILDS) results for leakage location and leakage rate determination in accordance with various embodiments of the present disclosure.
Figure 18B:
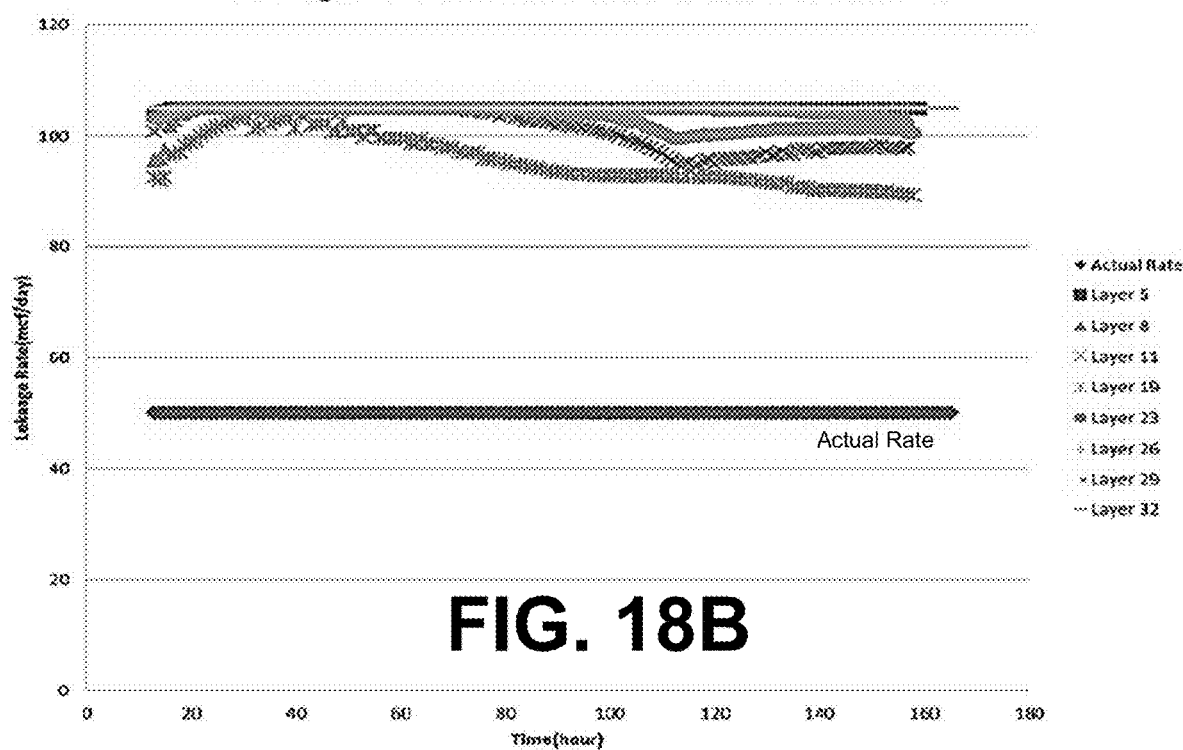
Figure 18C:
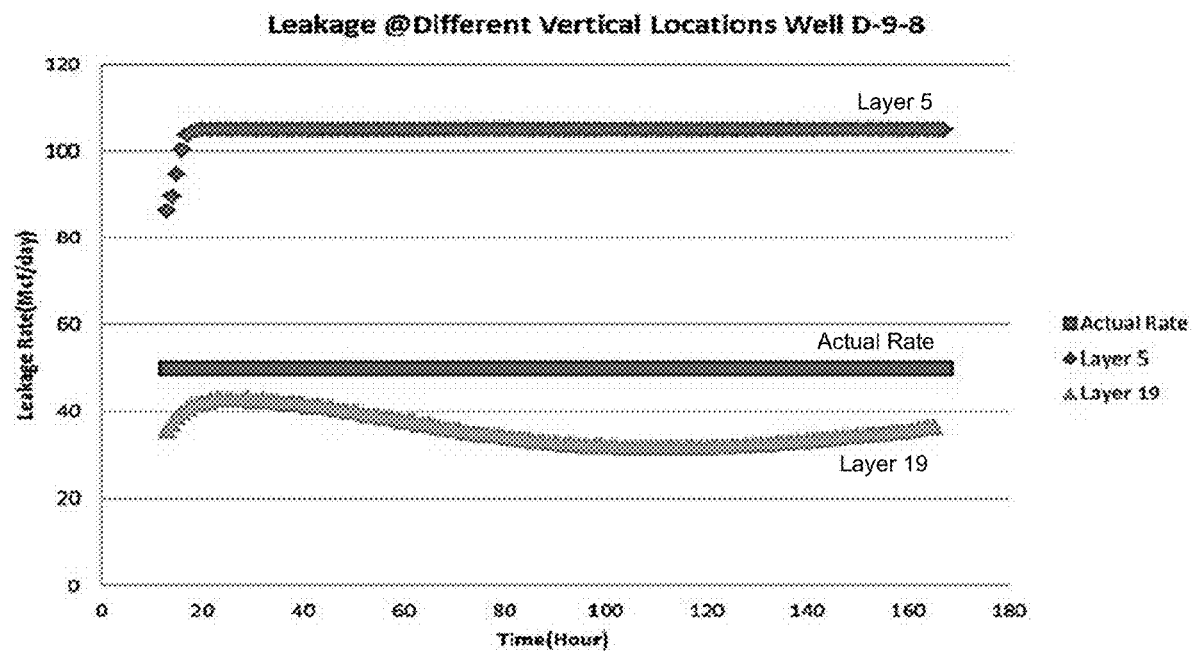

Several PDGs can be installed at the observation well, at multiple sand layers in the reservoir. By including a plurality of PDGs installed in various levels, it is possible to measure pressure changes due to $CO_2$ leakage at every layer. Therefore, the corresponding pressure changes ($\Delta P$) during potential leakage at well D-9-7 and/or well D-9-8 can be recorded, processed and provided to the RT-ILDS for analysis. The RT-ILDS results for $CO_2$ leakage location determination are shown in FIG. 18A and leakage rate are shown in FIGS. 18A, 18B and 18C. Based on the results for leakage location shown in FIG. 18A, it can be seen that RT-ILDS is able to detect the $CO_2$ location correctly when $CO_2$ leakage took place in well D-9-8 at different vertical locations (assuming existence of PDG in every layer). When $CO_2$ leakage took place at well D-9-7, RT-ILDS correctly determined the leakage location within 80 hours after the leakage (except the cases that well leaked form layer 5 and layer 29). 80 hours after the detection time, the results started deviating from actual location of well D-9-7.

A $CO_2$ leakage rate of 50 Mcf/day was assigned to each leakage scenario at different vertical locations along the well. For the case shown in FIG. 18B where well D-9-7 was leaking; the RT-ILDS leakage rate estimations were around 100 Mcf/day. When the leakage was from well D-9-8 (at the different layers), the RT-ILDS correctly determined the rate for $CO_2$ leakage from layer 19 as shown in FIG. 18C. However, the results for $CO_2$ leakage rate when leak was initiated from layer 5 were not satisfactory. This may be attributed to the pressure signals coming from different layers with completely different reservoir characteristics. Given the variation between layers, the pressure signals will not be exactly the same as the case for $CO_2$ leakage from layer 1 for which the RT-I LDS was developed and trained.

Effect of Gauge Accuracy or Pressure Drift on RT-ILDS Results

One parameter that affects the accuracy of the pressure measurements is the pressure sensor drift (PSD). Most PDGs experience drift over their life time. PSD can be defined as a gradual malfunction of the sensor that may create offsets in pressure readings from the original calibrated form. Changes in reservoir temperature or pressure can make the PDGs to respond differently depending on the manufacturing characteristics. The scale of PSD changes can vary according to working conditions and manufacturing specifications.

Figure 19A:
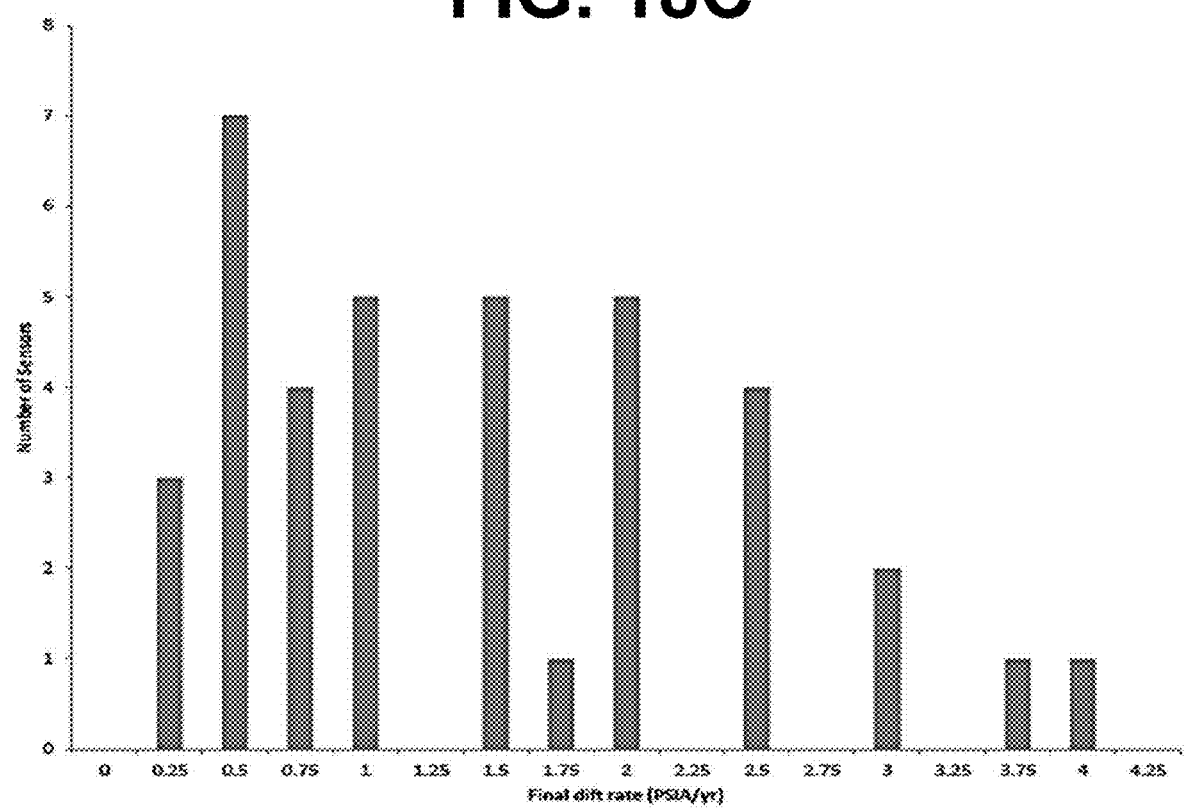
FIGS. 19A-19C are plots illustrating pressure sensor drift (PSD) effects on the RT-ILDS in accordance with various embodiments of the present disclosure.
Figure 19B:
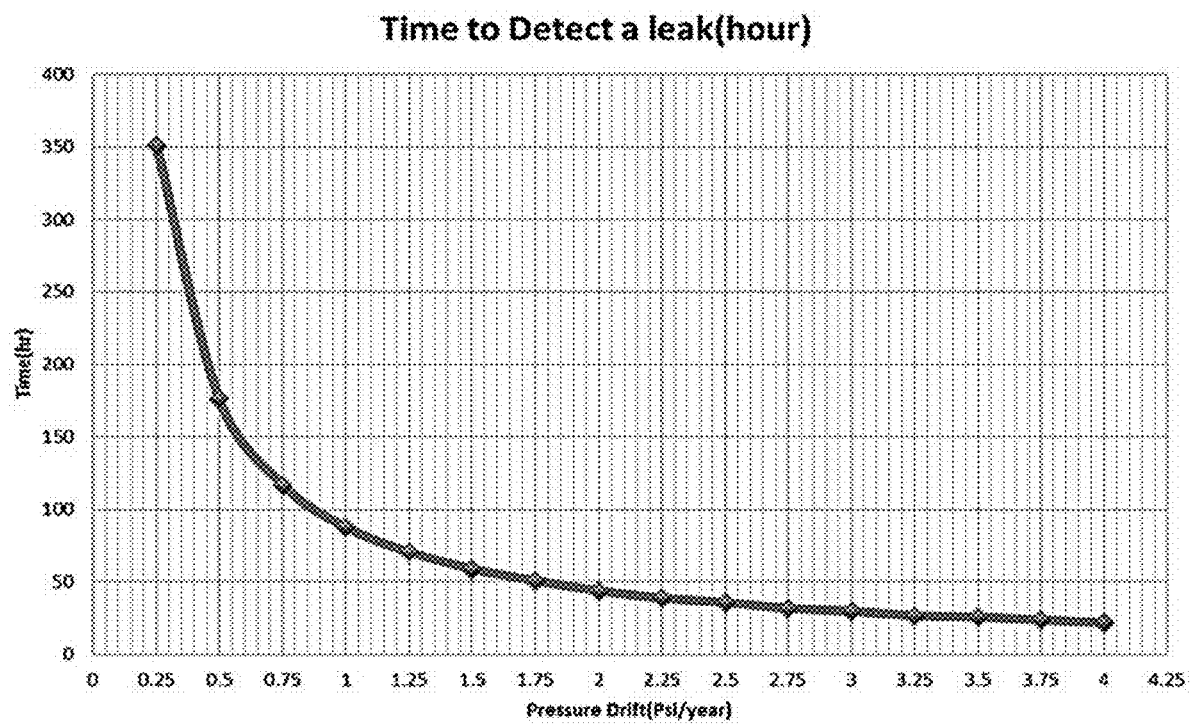

PSD can be measured as how much the pressure readings deviated from the original value in a year (psi/year) or other time period. Referring to FIG. 19A, shown are distributions of different PSD values for the PDGs. For RT-ILDS, Pressure Sensor Drift (PSD) can act as a $CO_2$ leakage indicator. When $\Delta P$ of greater than 0.01 is recorded by the pressure sensor, RT-ILDS reports a leakage and starts processing the data to quantify leakage characteristics. For example, a PSD of 1 psi/year can generate a $\Delta P=0.01$ about 88 hours after the initiation of the drift. FIG. 19B illustrated the time to detect (or report) a leak based on different PSD values.

Figure 19C:
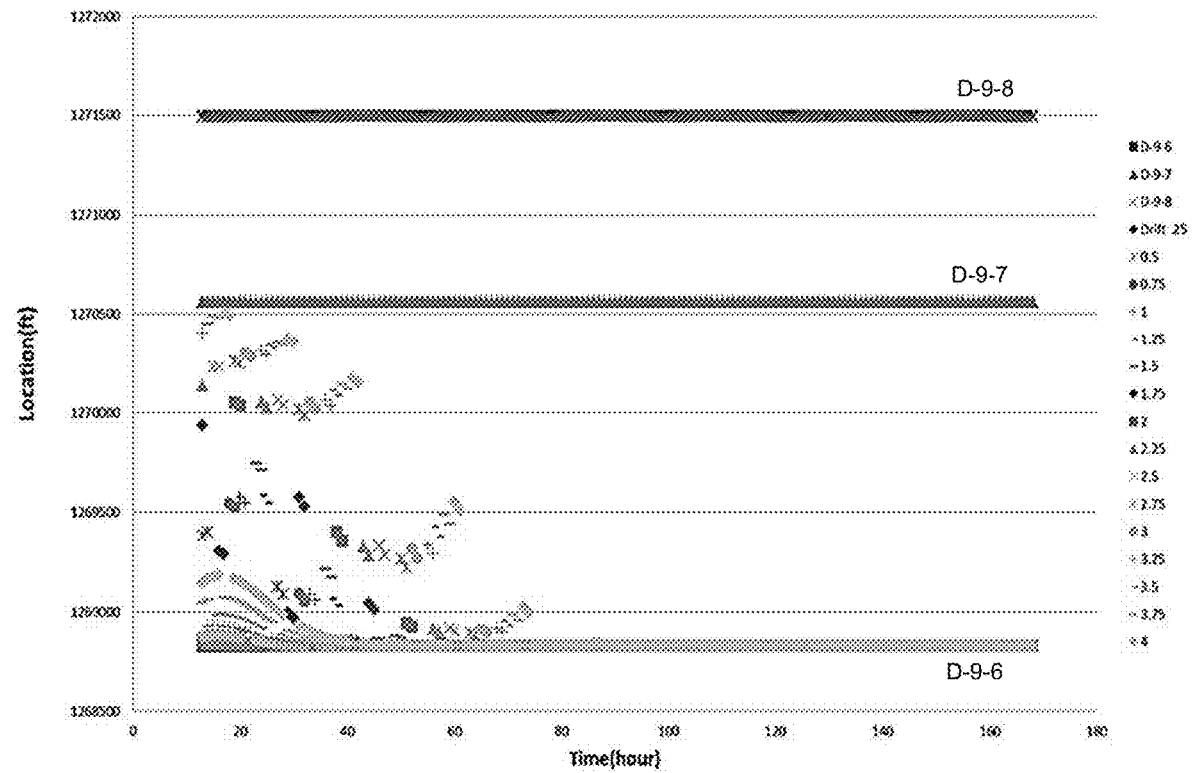

Based on the different values of FIG. 19B, the times that RT-ILDS mistakenly reported a leakage are illustrated in FIG. 19C. This leakage is due to PSD and not an actual induced pressure change. PSD trends over 168 hours were generated and applied to RT-ILDS (as a substitute for $\Delta P$ caused by actual leakage). The RT-ILDS estimation results for $CO_2$ leakage location and rate are shown in FIG. 19C. RT-ILDS results for the leakage location at early times oscillate between wells D-9-6 and D-9-7. After 80 hours, all the results converge to well D-9-6. This means that PSD makes ILDS to reports inaccurately that well D-9-6 is leaking.

Use of Well Head Pressure at Injection Well

Figure 20:
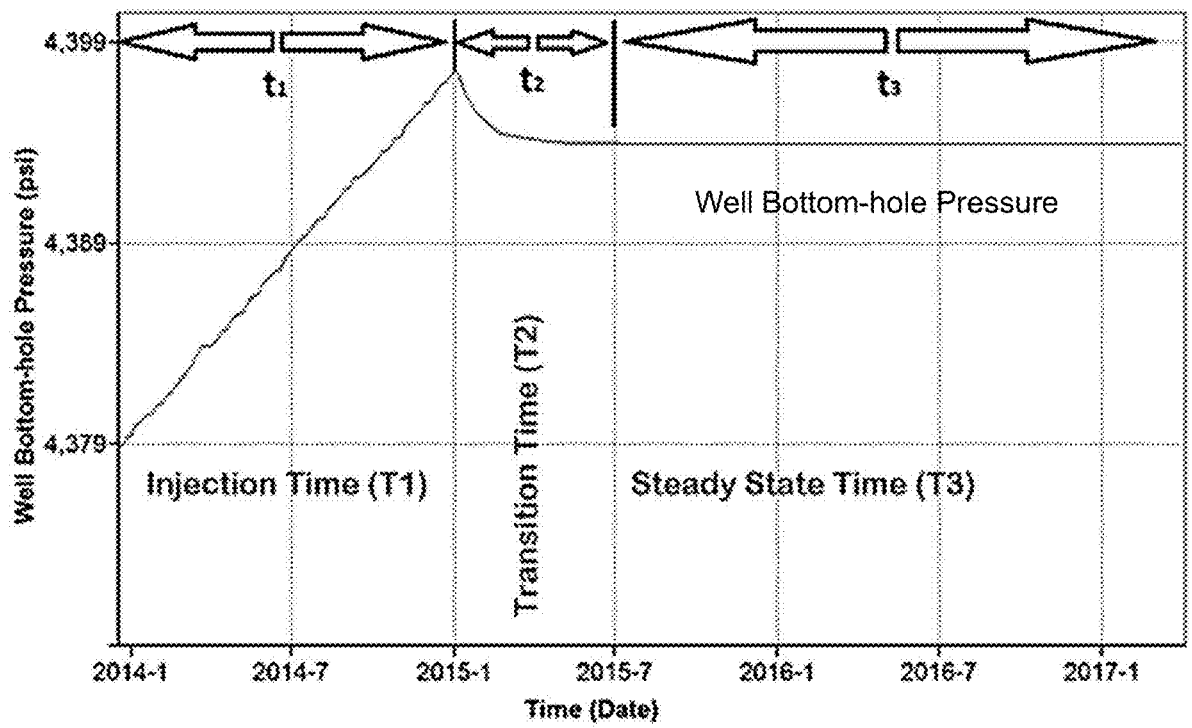
FIG. 20 is a plot of well bottom-hole pressure during and after $CO_2$ injection in accordance with various embodiments of the present disclosure.

Typically, there are three different reservoir pressure regimes that occur during injection and post injection. Referring to FIG. 20, shown is a plot of well bottom-hole pressure over the different time cycles during and after $CO_2$ injection. The first period ($t_1$) extends from the start of the $CO_2$ injection until it ends. Over this injection time period ($t_1$), the reservoir pressure increases in proportion to the amount of injected $CO_2$ and reaches a maximum value at the end of injection period. When the $CO_2$ injection ends, the reservoir pressure decreases over a transition time period ($t_2$) until the brine and injected $CO_2$ reach a semi-equilibrium point. At the end of the transition time period ($t_2$), the reservoir pressure remains almost constant (or decreases with a very slow trend) which can be referred to a steady state period ($t_3$). The RT-ILDS can monitor pressure during the steady state time cycle ($t_3$) when there has been no injection in the storage field, and the reservoir pressure has reached a steady state trend. Since $CO_2$ injection has stopped, there is no fluid flow in the well during this time period ($t_3$) and well head pressure would not change.

Figure 21:
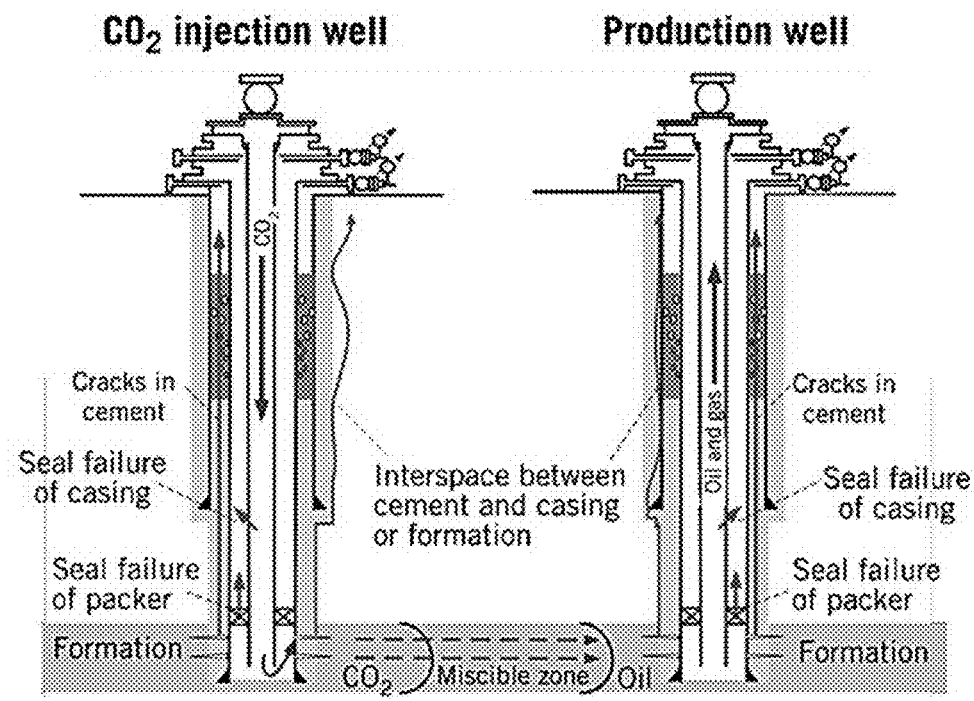
FIG. 21 illustrates casing pressure measurements in accordance with various embodiments of the present disclosure.

The wells can be equipped with a PDG that measures casing pressure as illustrated in FIG. 21. When there is only steady state production from tubing and no leakage occurs, the PDG measuring the casing pressure will show zero. Sometimes the gauge measuring the casing pressure may not read zero due to heating of the casing and completion fluids. By closing a needle valve, the casing pressure should return to zero. Otherwise, the casing continues to have sustained casing pressure (SCP), which is an indicator of leakage. Analysis of SCP can lead to determination of leakage pathway characterizations on the same well with no other wells in that area.

RT-ILDS for Variable Leakage Rates

Figure 22A:
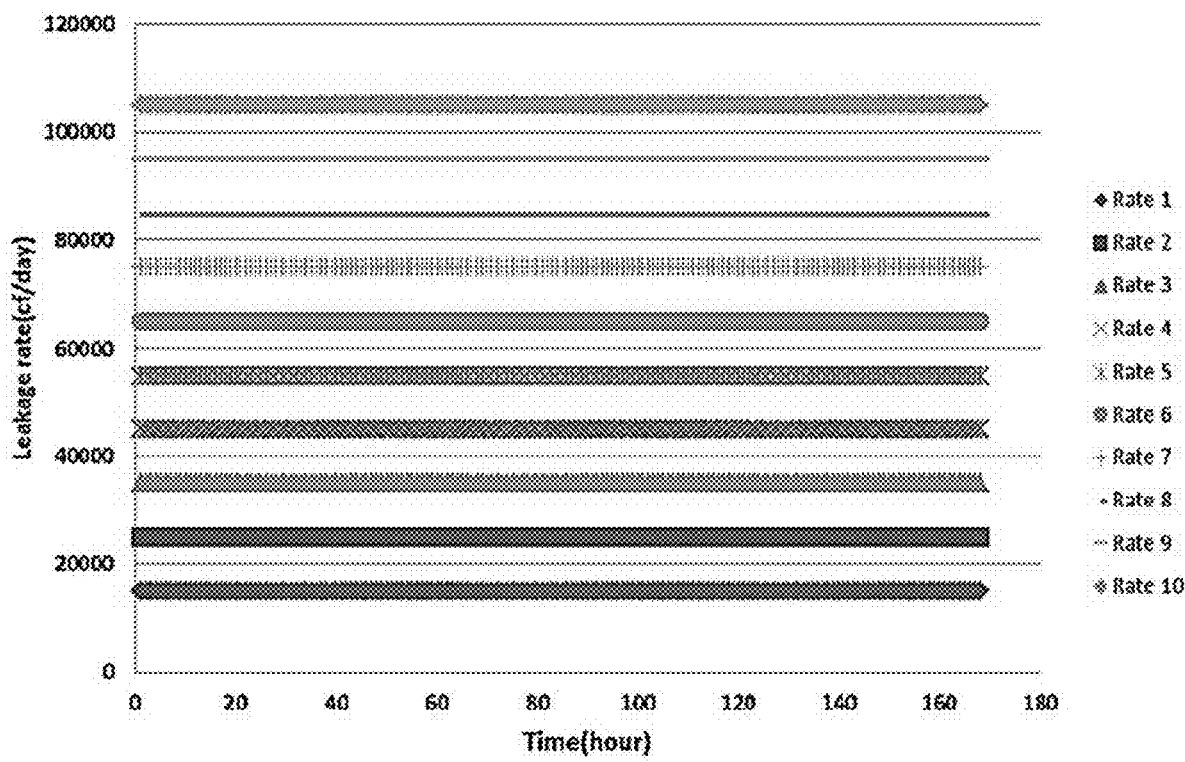
FIGS. 22A-22C illustrate examples of pressure variations (e.g., CO2 leakage rate) in accordance with various embodiments of the present disclosure.
Figure 22B:
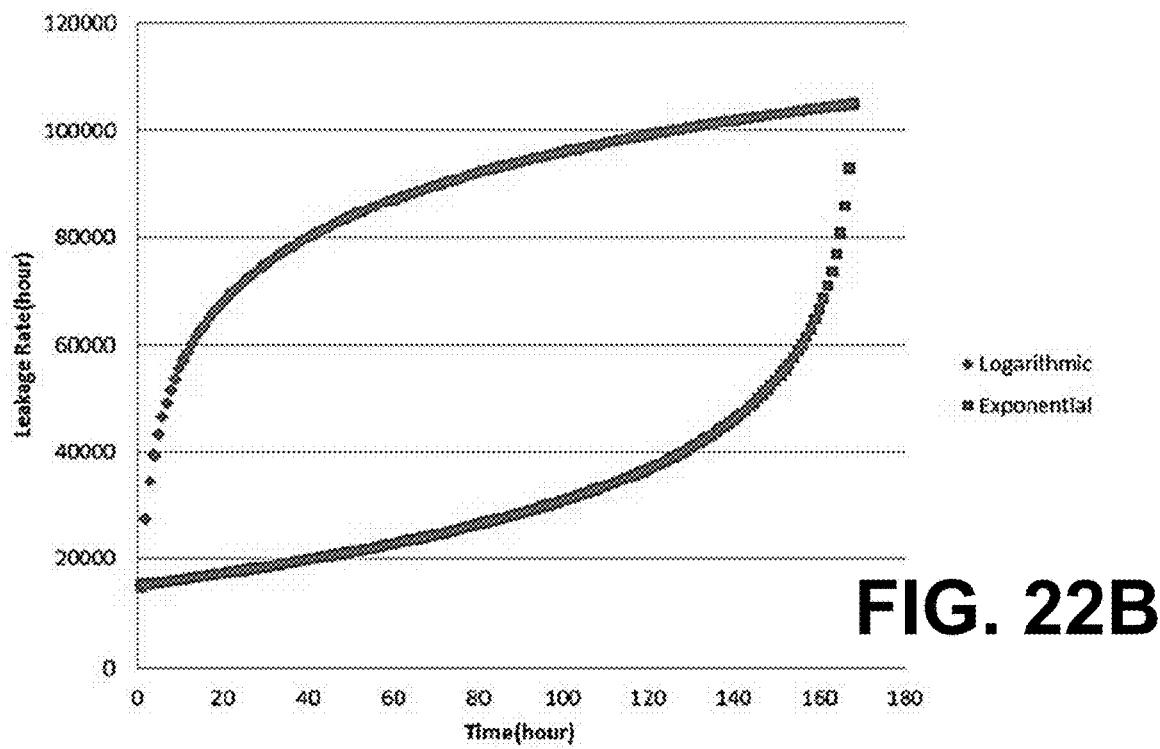
Figure 22C:
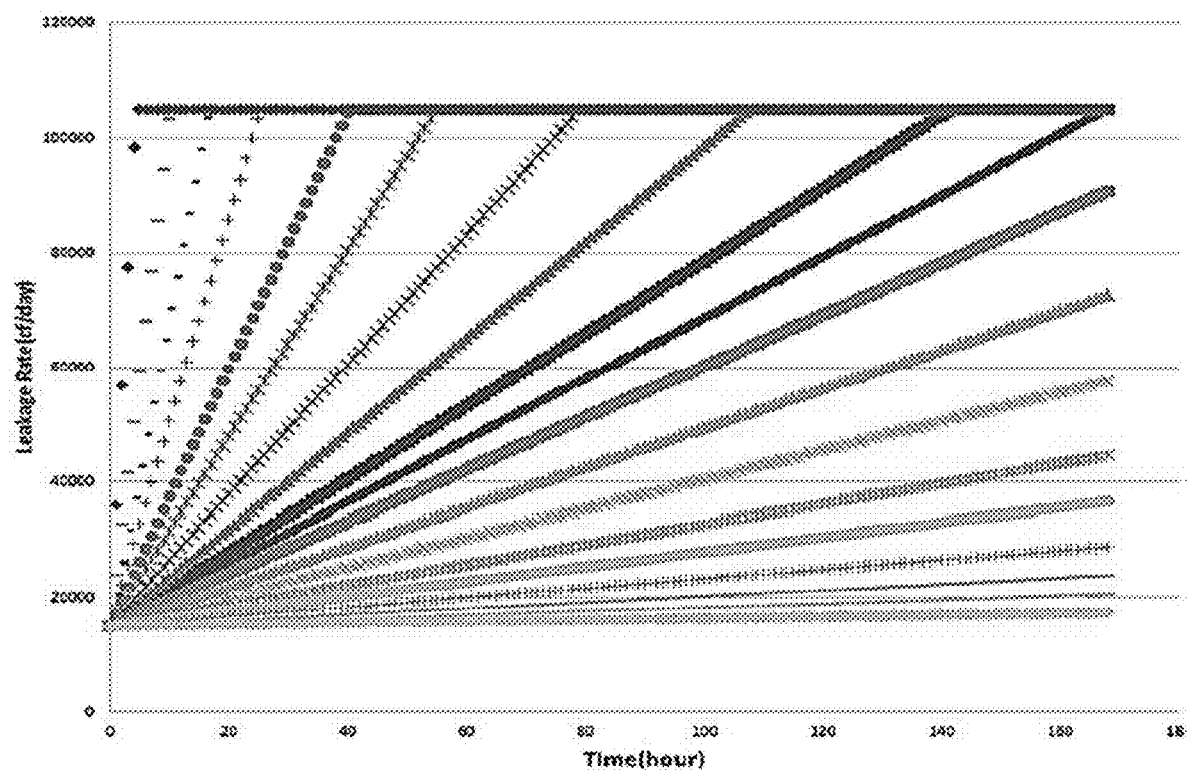

The RT-ILDS is capable of analyzing pressure signals that were generated by $CO_2$ (or other gas) leakage rates with step function behavior illustrated in FIG. 22A. To simulate the step function behavior, the $CO_2$ leakages were initiated at a defined rate that remained constant as the time passed. The effects of variable $CO_2$ leakage on the performance of RT-ILDS were also evaluated using a set of simulation runs designed with different $CO_2$ leakage rate behaviors including, e.g., linear, exponential and logarithmic changes. The corresponding pressure signals for each variable rate function were included in leakage detection system development. Examples of exponential and logarithmic $CO_2$ leakage rate functions are shown in FIG. 22B. Additionally, 20 different linearly changing $CO_2$ leakage rates were assigned to each possible leakage locations (wells D-9-6, D-9-7, and/or D-9-8) in the reservoir simulation model, for 60 total simulation runs. Examples of the linear $CO_2$ leakage rates are shown in the FIG. 22C.

The corresponding pressure signals for each $CO_2$ leakage scenario were collected, processed and sorted to form a data set which is appropriate for pattern recognition technology. For $CO_2$ leakage location detection with different leakage rate functions, all of the pressure signals (coming from the 60 simulation runs) as function of time and their calculated time-based descriptive statistics were lumped together to form the input data set. Therefore, the input data set included 10,950 data records that were partitioned into training, calibration and verification sets based upon the ratios 80%, 10% and 10%, respectively. The outputs for the neural network were the three leakage locations of wells D-9-6, D-9-7, and D-9-8.

Figure 23A:
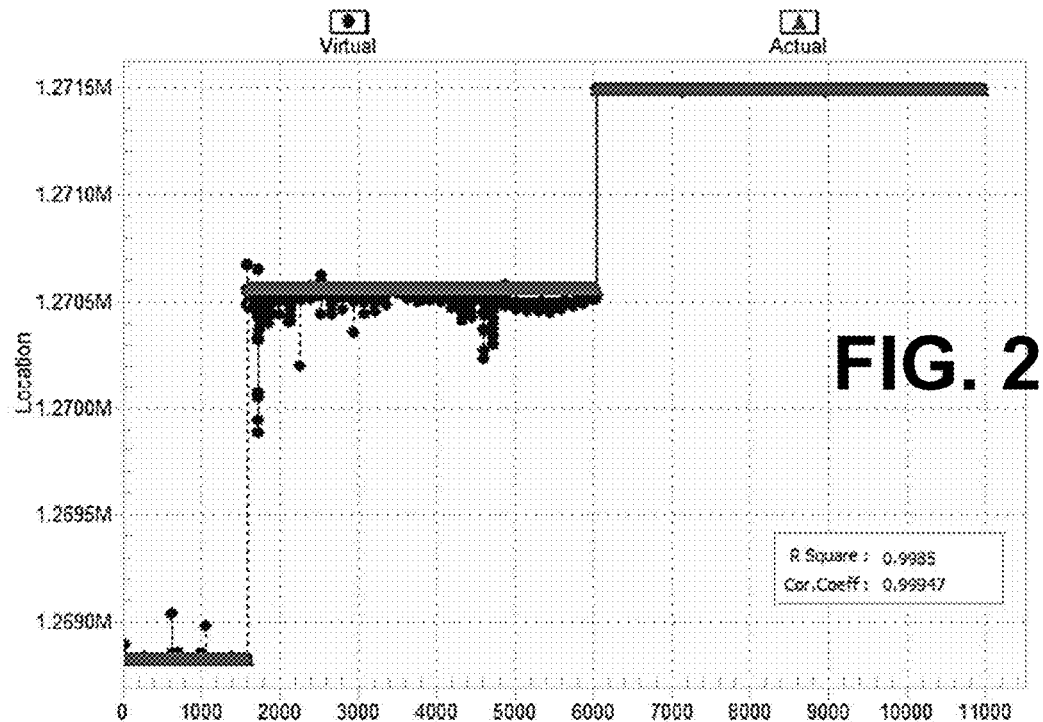
FIGS. 23A and 23B are plots of neural network training results in accordance with various embodiments of the present disclosure.
Figure 23B:
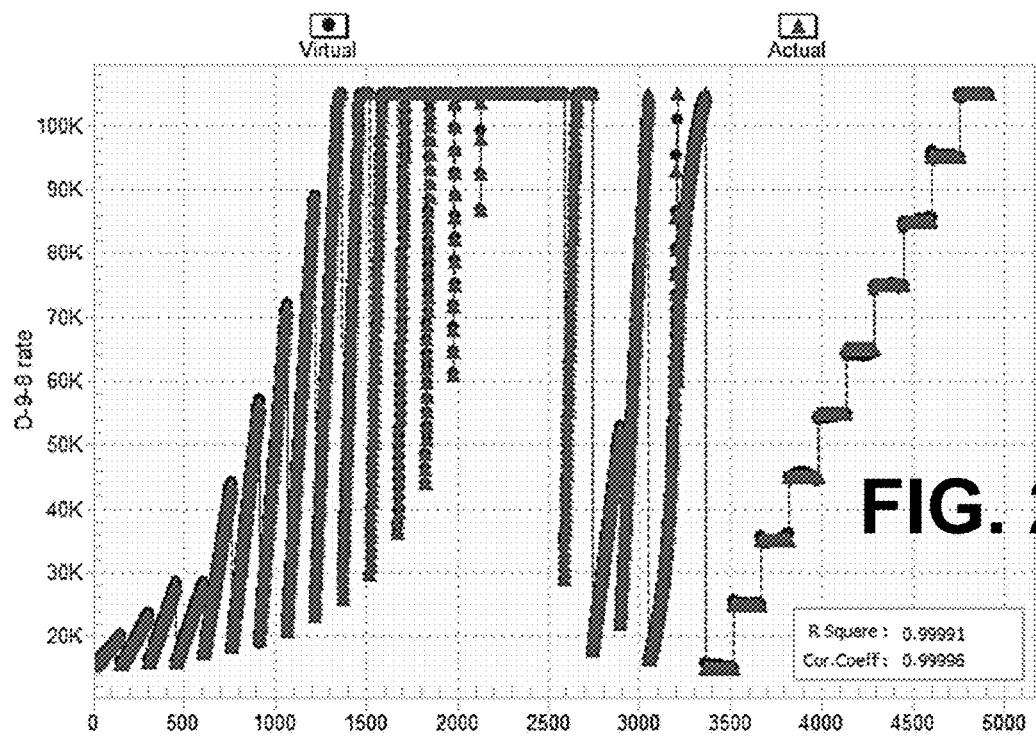

A back-propagation neural network with 50 neurons in hidden layers was selected for training process. Neural network results (virtual versus actual) for $CO_2$ leakage location are shown in FIG. 23A. As in previous situations, the neural network was able to find the pattern between leakage location and pressure signals with high precision ($R^2=0.998$). Three neural networks were individually trained for each well to detect the leakage rate. The input data was the same as that used for the leakage location training. However the output was the $CO_2$ leakage rate at each specific time. The neural network architecture was almost the same as previous ones except that a different number of neurons were used in the hidden layers. The results for $CO_2$ leakage rate from well D-9-8 are shown in FIG. 23B. The neural networks were able to determine a pattern between 32 different $CO_2$ leakage rate functions (as a function of time) and the corresponding pressure signals quite accurately ($R^2=0.999$).

Figure 24A:
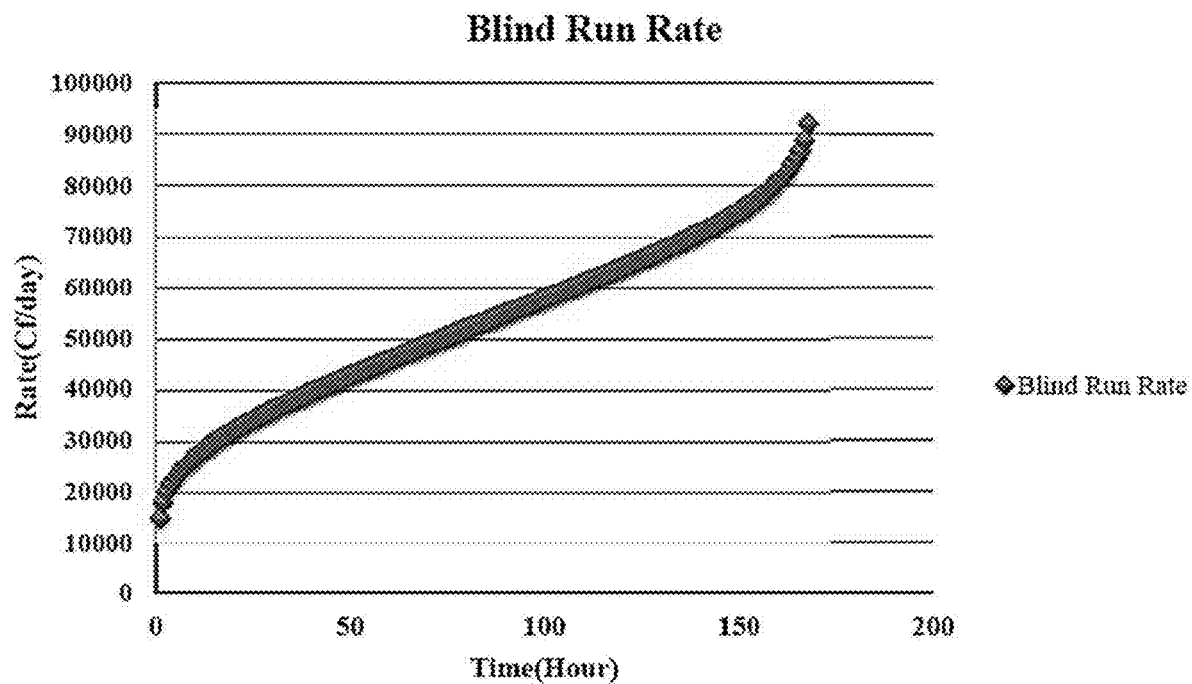
FIGS. 24A-24C illustrate validation of RT-ILDS performance in accordance with various embodiments of the present disclosure.

To further validate the performance of the RT-ILDS, a complex $CO_2$ leakage rate as a function of time was considered for a blind test. This rate function represented a logarithmic behavior at the beginning followed by a linear trend. The end part of the rate function showed exponential characteristic. The rate function for the blind run is illustrated in FIG. 24A. The rate function was assigned to each of the leakage locations (D-9-6, D-9-7, and D-9-8) as the rate constraints and corresponding pressure signals from the observation well (D-9-8) were collected. The pressure signals were processed to determine real time ΔP and calculate the descriptive statistics values to be applied to the RT-ILDS.

Figure 24B:
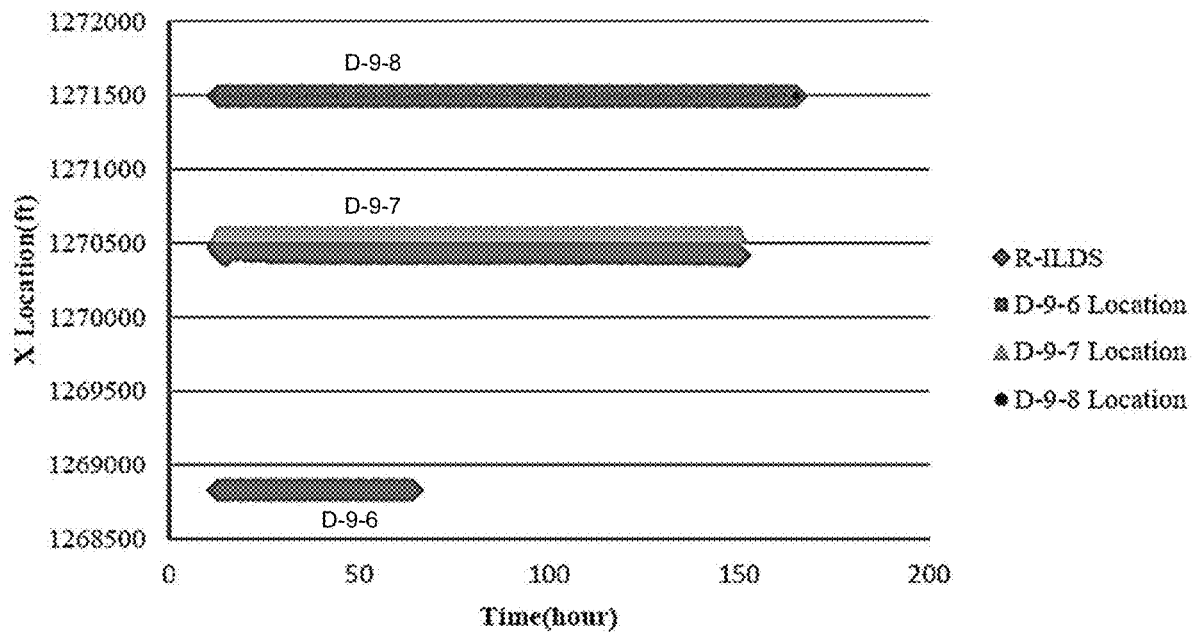
Figure 24C:
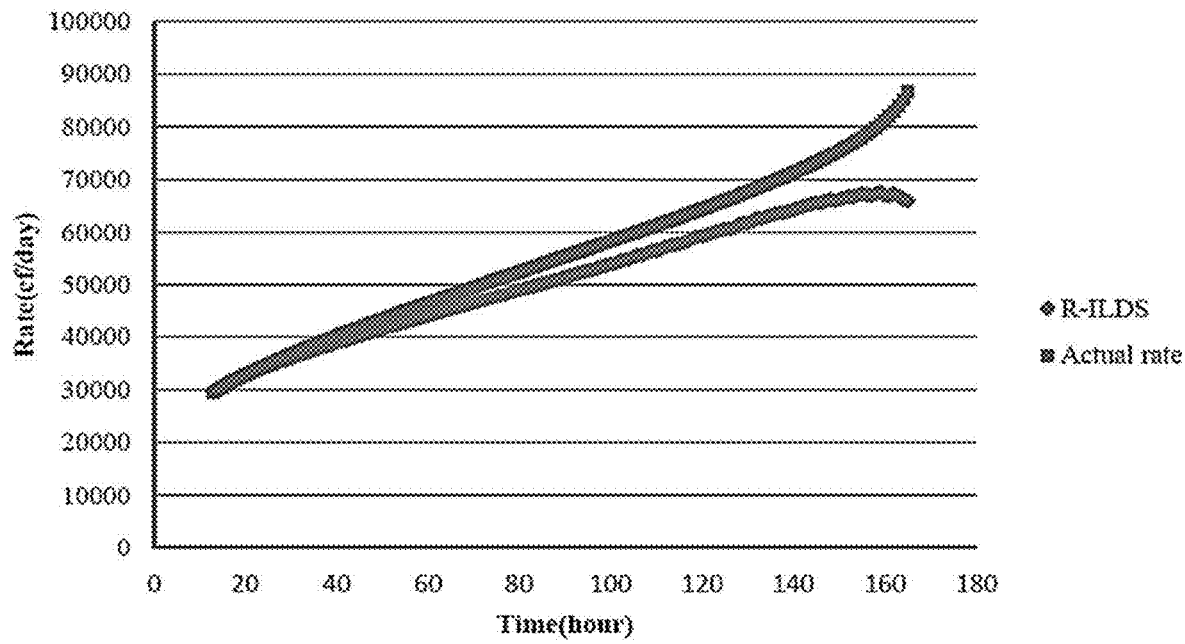

The RT-ILDS estimations for the $CO_2$ leakage location and leakage rate (at well D-9-8) are shown in FIGS. 24B and 24C, respectively. As can be seen in FIG. 24B, the RT-ILDS estimations for the $CO_2$ leakage locations were reasonably accurate. The RT-ILDS was able to estimate the location of each well correctly. For the $CO_2$ leakage rate in well D-9-8, the RT-ILDS estimation shown in FIG. 24C represented the actual rate at the early times with reasonable accuracy. RT-ILDS estimated just one value for rate at each time.

In order to have range of rates rather than a single value, "Monte Carlo" simulation was used. Monte Carlo method is a computerized mathematical technique designed for explanation of risk in quantitative analysis and decision making. The following elements illustrate the Monte Carlo simulation process:

Identification of a range for possible inputs;

Generation of random inputs from a probability distribution over the range;

Execution of a large number of simulations with determined inputs; and

Collection, combination and analysis of the results.

The domain of the input parameters can be defined using key performance indicator (KPI) analysis.

Figures 25A, 25B:
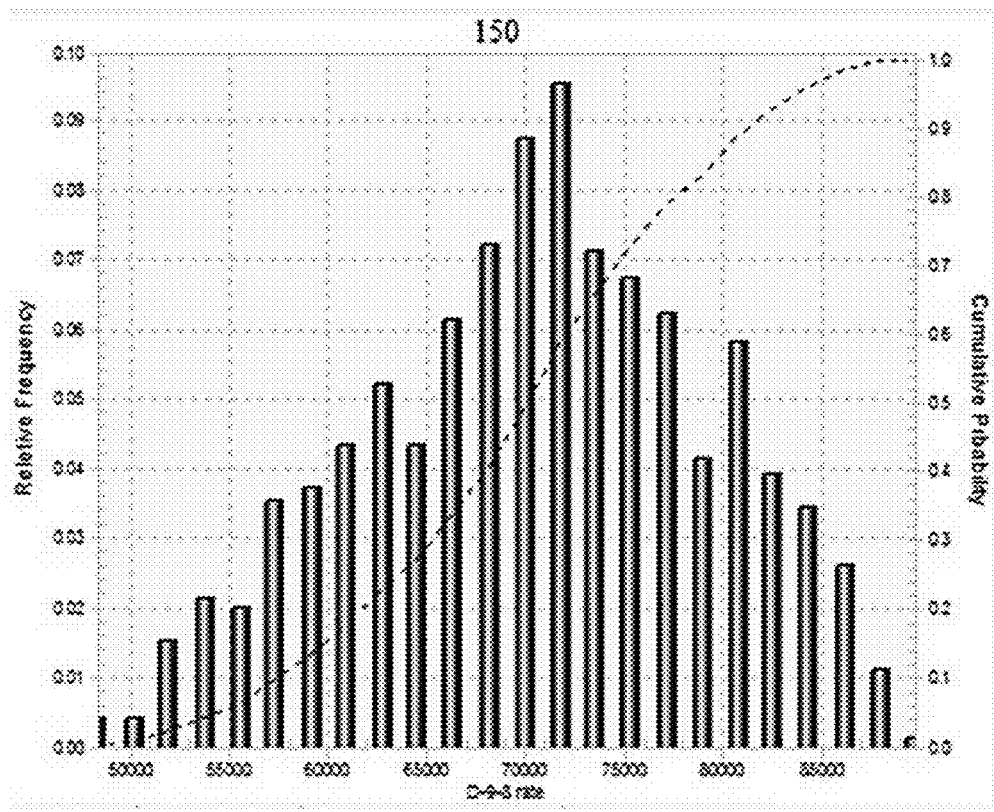
FIGS. 25A and 25B illustrate Key Performance Indicator and estimation of leakage rate in accordance with various embodiments of the present disclosure.

An example of the KPIs for leakage rate in well D-9-8 is shown in FIG. 25A. Cumulative summation ΔP (Cum Sum (DeltP)), average ΔP (Cum Average(DeltP)), standard deviation ΔP (Cum ST(DeltP)) and skewness (Cum Skewness (DeltP)) indicated the most impact on the $CO_2$ leakage rate in well D-9-8. Based on a "±20%" rectangular probability distribution, 1000 random variables for each parameter were generated. The trained neural network then computed the $CO_2$ leakage rate 1000 times based on combinations of the generated input variables. Calculated leakage rates were sorted according to their relative frequency and cumulative probability. FIG. 25B shows the relative frequency and cumulative probability for the leakage rate 162 hours after leakage was detected. The actual rate was 83 Mcf/day while RT-ILDS determination indicated 67.4 Mcf/day. As shown in FIG. 25B, Monte Carlo results provided a leakage rate range that included the actual rate.

Use of PDG in Injection Well

Two PDGs were installed in the well D-9-8 to measure and transfer real-time pressure data to the surface. The PDGs can be installed in the injection well (D-9-7) rather than in the observation well. This can reduce the need for drilling an observation well. All of the reservoir simulations runs that addressed the 30 different $CO_2$ leakage scenarios were repeated in order to generate high frequency pressure data at the injection well. The same procedure was used to apply the new sets of data (high frequency pressure data collected at the injection well) to the RT-ILDS. According to the training results, the RT-I LDS was able to estimate the $CO_2$ leakage rates with good precision (the $CO_2$ leakage rate $R^2$ were more than 0.99 for all three wells, D-9-6, D-9-7, and D-9-8). For the $CO_2$ leakage location, the RT-ILDS results did not represent the actual locations ($CO_2$ leakage location $R^2$ was 0.49). This may be attributed to the injection well having been located approximately in the middle of wells D-9-6 and D-9-8 as shown in 14A. As can be seen, the distance between the injection well and the other wells is almost equal.

Figure 26:
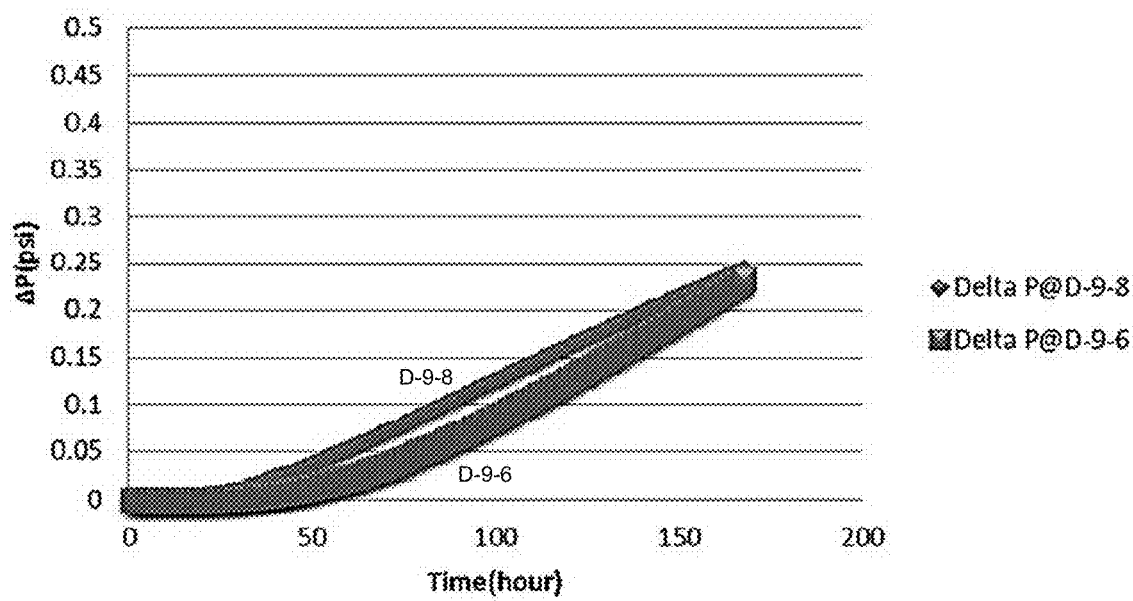
FIG. 26 illustrate examples of pressure signals received from PDGs in accordance with various embodiments of the present disclosure.

This symmetric characteristic of the well locations leads to substantially the same pressure signals when either well D-9-6 or D-9-8 leaked. FIG. 26 shows a plot of the pressure signals subject to leakage from wells D-9-6 and D-9-8. Since the injection well is located in the middle of $CO_2$ plume (based on the reservoir characterization), it receives the same pressure signals from different leakages that are at the same distance to the well. Therefore it is not possible to detect the exact location correctly. PDGs should be installed at a location that can provide distinct pressure signals from the different leakage locations. The use of a second monitoring well can enable directional detection of the $CO_2$ leakage location. For example, directionality may be provided by monitoring PDGs in both the injection and observation wells.

Leakage from Cap Rock

Initially, the reservoir was assumed to have a continuously sealed cap-rock that prevented any communication between the reservoir and formations above it. After the injection period, pressure on one side of the seal (in the target zone) would increase leading to a pressure difference across the cap-rock. When the pressure difference across the cap rock exceeds the fracture pressure, the seal layer can breach and provide a path for $CO_2$ (or other gas) to migrate to the other layers. In order to model cap-rock leakage in the reservoir simulator, the pressure in the Dantzler sand located on top of the seal was estimated by having the pressure gradient in the formation and its average depth. This pressure was assigned as the constraint for the cap rock leakage in the model. The pressure difference between two layers was assumed to be the main driving force for gas flow through the leakage path.

Figure 27A:
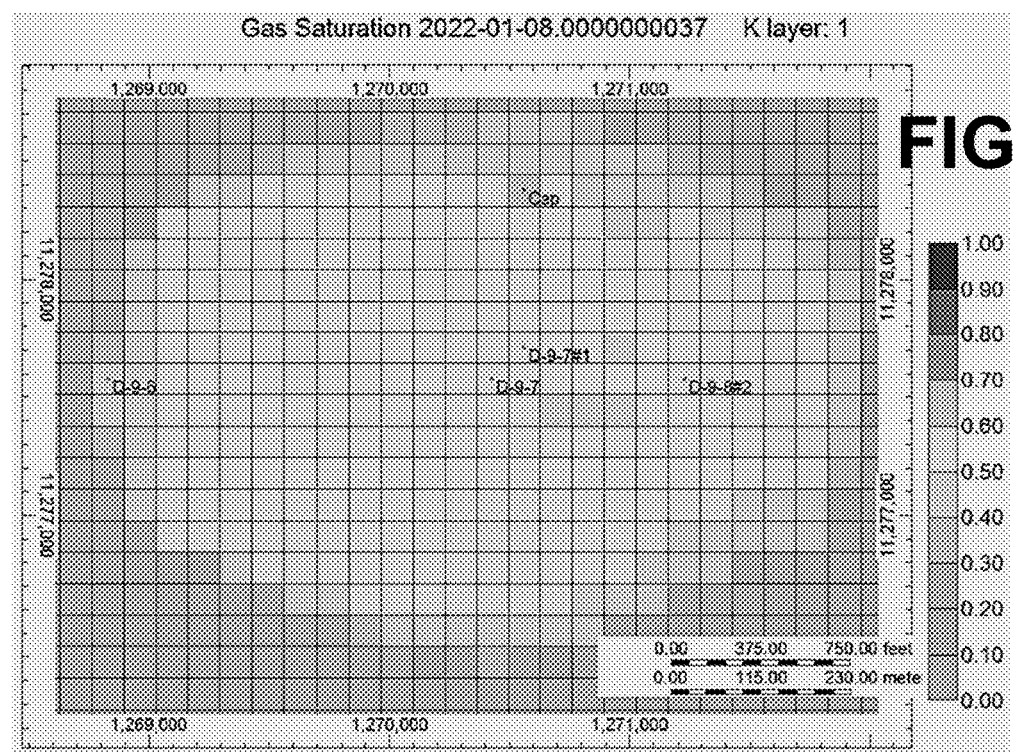
FIGS. 27A-27C illustrate examples of cap rock leakage in accordance with various embodiments of the present disclosure.
Figure 27B:
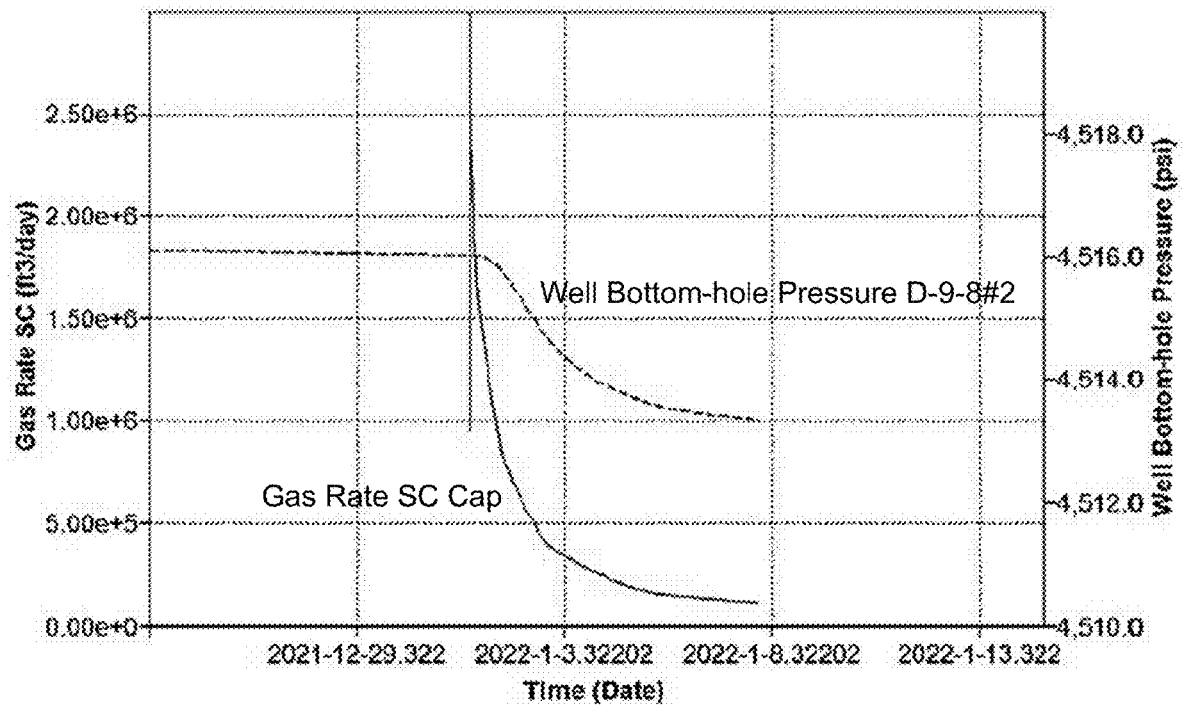

As an example, consider the reservoir pressure (in the observation well) and $CO_2$ leakage rate behavior for the case where cap rock leakage occurs north of the injection well. FIG. 27A illustrates the location of the cap rock leakage with respect to the other wells. The pressure behavior in the observation well and $CO_2$ leakage rate due to cap rock breach is shown in FIG. 27B. When the cap-rock fracture is initiated, a large amount of $CO_2$ can be released and leaked to the upper layer in a very short period of time (less than a day). This high flow rate of $CO_2$ leakage causes sharp decline in the reservoir pressure.

Figure 27C:
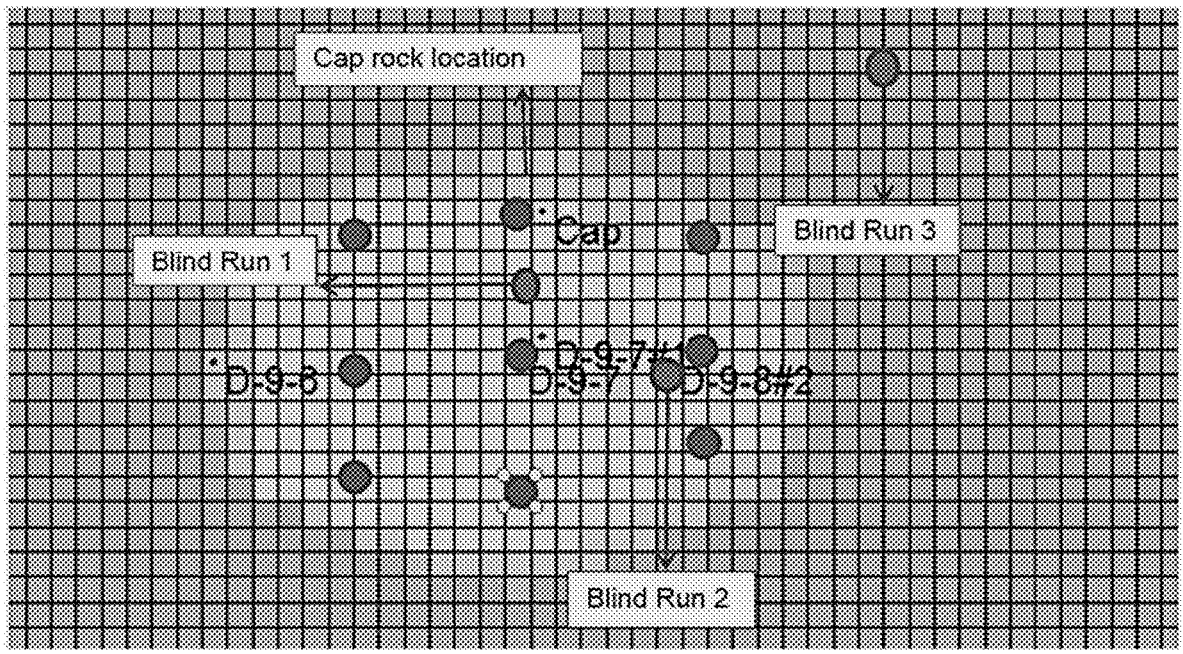

As the reservoir pressure decreases, the driving force (pressure difference between reservoir and top sand layer) declines and slows the $CO_2$ (or other gas) leakage rate. Typically, the pressure signal that is created due to the cap rock leakage represents higher amplitudes when compared with the well leakages signals that were previously discussed. Therefore a different RT-ILDS implementation was used to detect and quantify the characteristics of cap rock leakage. To develop the RT-ILDS for detecting the cap-rock leakage, nine different simulation runs were designed based on the location of the leakage. FIG. 27C shows the different locations for the cap rock leakage and three blind runs. The only constrain for cap-rock leakage was pressure in the upper layer (Dantzler sand), which was assigned as the bottom-hole pressure for a synthetic well that was drilled in the leakage location.

As mentioned earlier, there is a sharp increase in the $CO_2$ leakage rate. To eliminate this peak in the $CO_2$ leakage rate behavior, the cumulative amount of leaked $CO_2$ was used instead of the leakage rate. The training process was the same as previously explained. For each leakage scenario, the corresponding pressure signals were processed in real time by descriptive statistics to be used as the input for the neural network. The outputs of the neural network were the leakage location (x and y) and the cumulative leaked $CO_2$. The neural network results for cumulative leaked gas and the x coordinate of the leakage location were precise with $R^2$ equal to 0.97, and 0.99, respectively. For the y coordinate of the leakage location, the neural network estimations were not as accurate as the x coordinate. This might be attributed to the symmetric locations of cap-rock leakages with respect to the observation well in "y" direction.

The final part for the verification of the cap-rock R-ILDS was to design a set of blind runs that were not used during the neural network training process. Three cap-rock leakage locations were considered in the reservoir simulation model of FIG. 27C. Two cap-rock leakage locations (out of three) were inside the range of the locations used for neural network training. For cumulative leaked gas, the RT-ILDS results are almost the same as the actual values for the first two blind run cases, which were located in the range of locations. For the third blind run, which was located outside the range, the RT-ILDS results overestimated the actual value considerably. X-coordinate results were almost the same as actual locations except blind run 2. For the y coordinate results, there were noticeable differences between actual values and RT-I LDS estimation. Overall, the location of cap-rock leakage can be determined, however it may not be as accurate as well-leakage due to symmetry of the location and the impulsive and uncertain behavior of the leakage.

Multi-Well Leakage

Since it is possible for leakage to simultaneously take place at multiple locations, the capabilities of the RT-ILDS to detect multiple leakages was examined. To investigate multi-well leakage, a combination of leakage rates for two and three wells were assigned to the wells in the reservoir model according to the table of FIG. 28A.

Figures 28B, 28C:
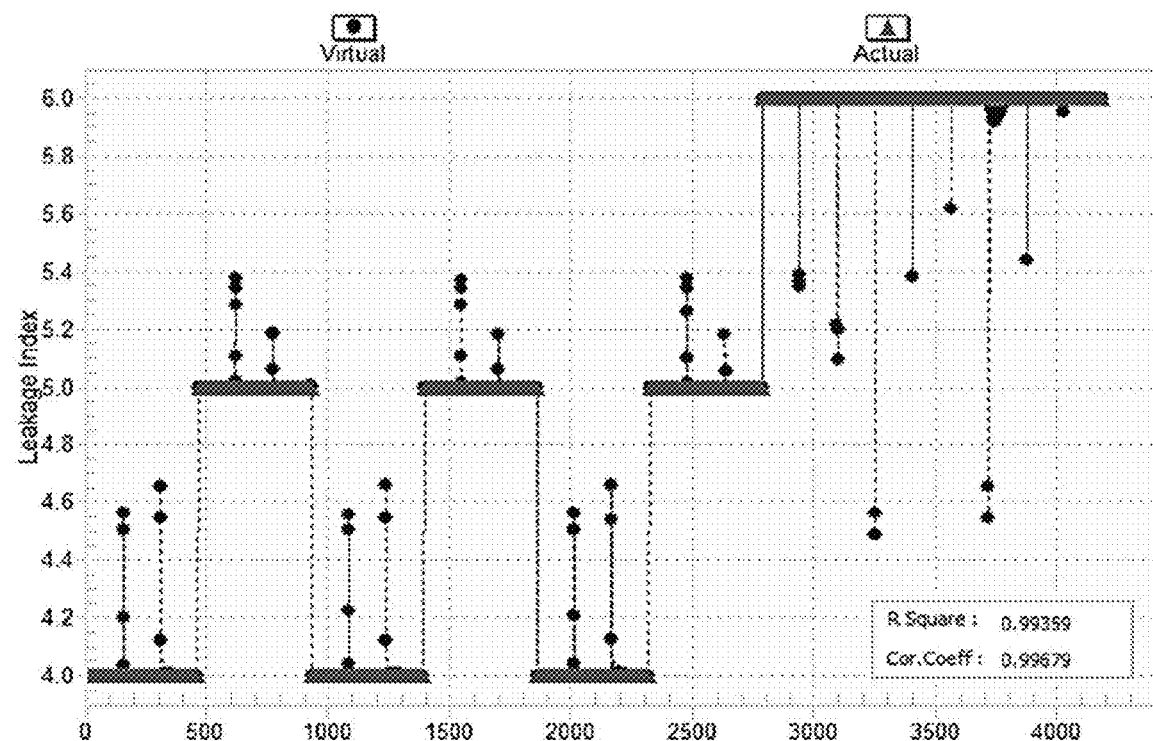

After performing simulation runs based on multi-well leakage scenarios and processing all the corresponding pressure signals, a neural network was trained to differentiate between various combinations of well leakages. In this regard, a "leakage index" was defined based on the distance of each well from the observation well. Longer distances from the observation well resulted in selecting lower values for the leakage index. The index values ranged from 1 to 7, with higher values representing higher pressure signal amplitude) according to distance to the observation well and the number of the leaking wells. All the scenarios can be divided into three classes as: single well leakages (indices: 1, 2, and 3), two well leakages (indices: 4, 5, and 6) and three well leakage (index: 7). The leakage index values are shown in FIG. 28B.

Several neural networks were trained considering different leakage indices as the output and processed pressure signals ($\Delta P$) as the input. The convolution of several pressure signals (generated by different combinations of well leakages) makes it very difficult for the neural networks to catch specific patterns out of final pressure signals. In order to de-convolve mixed pressure signals (generated by multi-well leakages), existence of an additional PDG was considered in the injection well (in addition to the observation well). Only two well leakages were subject to investigation (leakage index values of 4, 5, and 6). The addition of one more PDG provided more information about pressure signals and the time that signals were observed by the PDGs. For this case, a neural network was trained using a generalized regression neural network (GRNN) algorithm. The results for neural network training are shown in FIG. 28C.

Figures 28D, 28E:
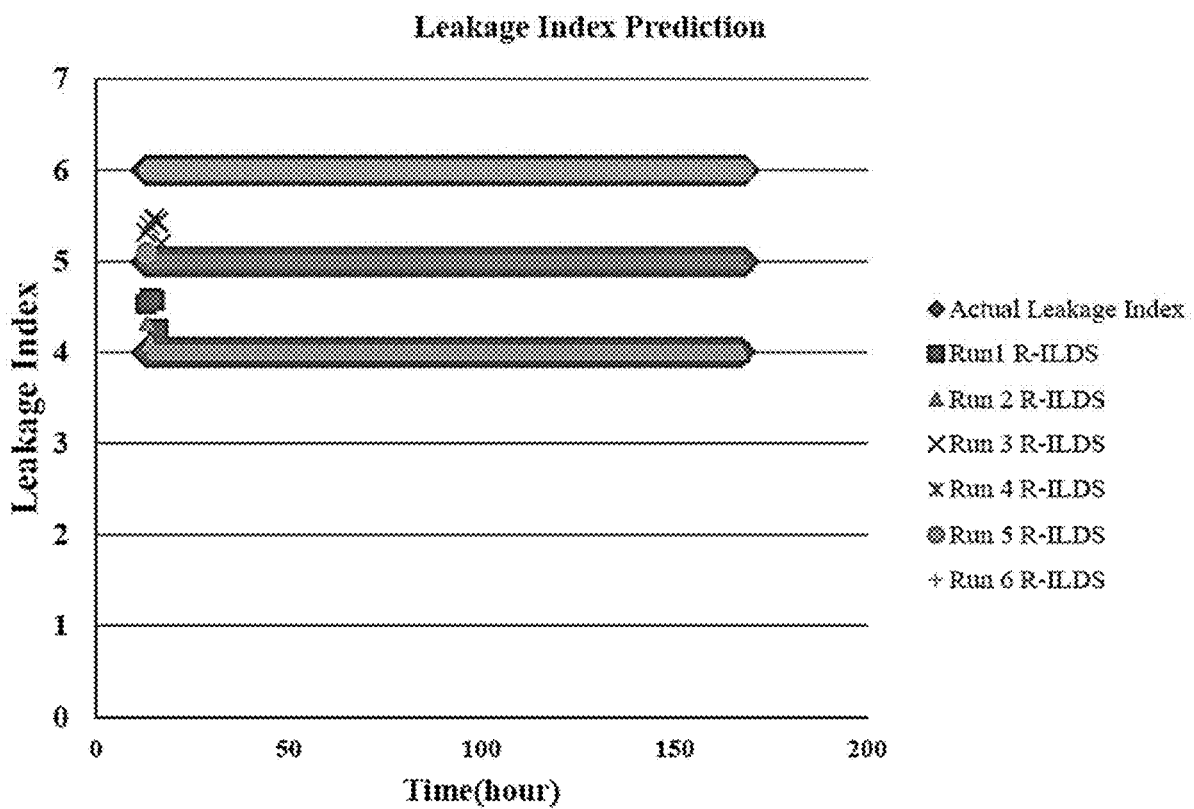

By adding more PDGs in the injection well, the results for neural network training improved significantly ($R^2$ equal to 0.9935). As a result, it became possible to differentiate which two wells were leaking by having pressure signals coming from two pressure down-hole gauges. The final step was to verity the practicality of the RT-ILDS which was devolved for multi-well leakage. To do so, six simulation runs considering combinations of two-well leakages were performed. The table in FIG. 28D summarizes the $CO_2$ leakage rates for the two well blind runs. The results for blind run verifications are shown in FIG. 28D. RT-ILDS was able to estimate the leakage index correctly except for a few hours immediately after the leakages. Although the probability of two wells leaking simultaneously is low, the use of PDGs installed in two distinct wells makes it possible to distinguish which wells are leaking at the same time.

Figure 29:
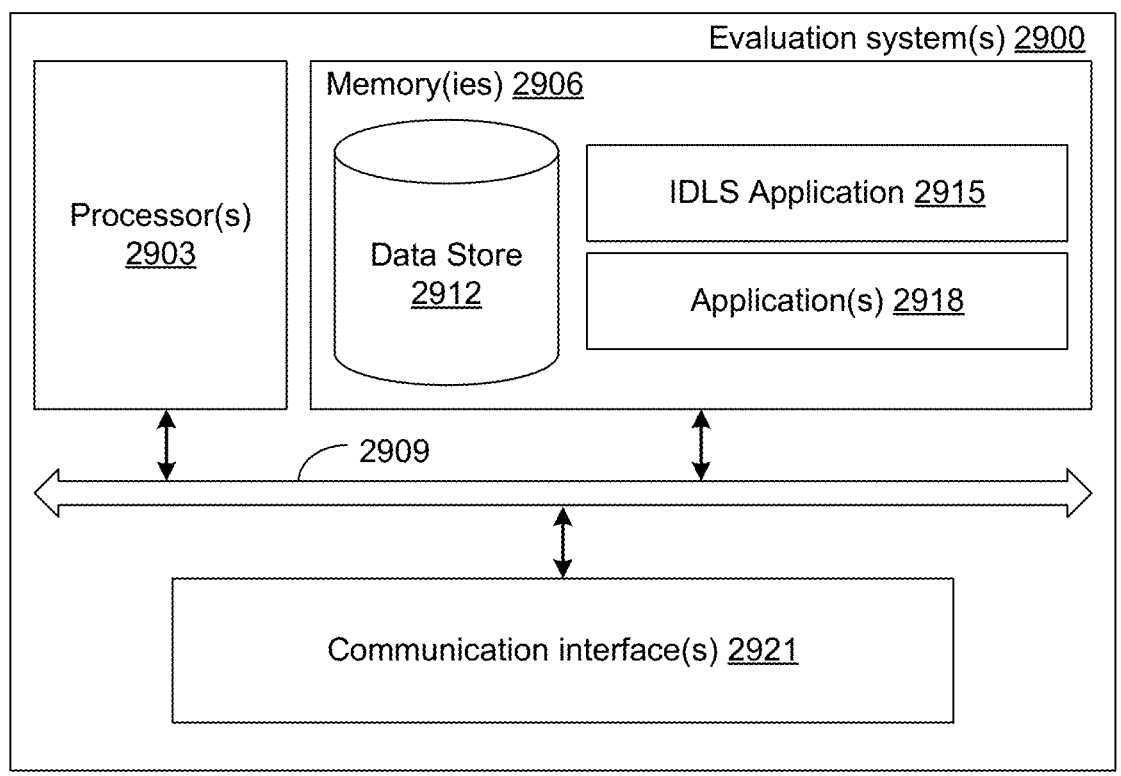
FIG. 29 is a schematic block diagram of an evaluation system in accordance with various embodiments of the present disclosure.

Wth reference to FIG. 29, shown is a schematic block diagram of an example of an evaluation system 2900 according to various embodiments of the present disclosure. The evaluation system 2900 can include at least one processor circuit, for example, having a processor 2903 and a memory 2906, both of which are coupled to a local interface 2909. To this end, the evaluation system 2900 can comprise, for example, processing circuitry, which may be used to evaluate the presence of leakage from a geological $CO_2$ storage site. The local interface 2909 can comprise, for example, a data bus with an accompanying address/control bus or other bus structure as can be appreciated. The processor 2903 can communicate with PDGs installed in one or more wells via communication interface(s) 2921 and the local interface 2909. The communication interface 2921 can communicate with a monitoring system in communication with the PDGs. A monitoring system can be used to wirelessly obtain pressure data from the PDGs and communicate that information to the evaluation system for analysis to determine if leakage is present.

Stored in the memory 2906 are both data and several components that are executable by the processor 2903. In particular, stored in the memory 2906 and executable by the processor 2903 may be an intelligent leakage detection system (ILDS) application 2915 and/or other applications 2918. Also stored in the memory 2906 can be a data store 2912 for storing measured data received by the evaluation system 2900, analysis results determined by the ILDS application 2915 and other data. In addition, an operating system can be stored in the memory 2906 and executable by the processor 2903.

The ILDS application 2915 can be configured to implement one or more aspects of the $CO_2$ leakage detection technique discussed herein. For example, the ILDS application 2915 can be executed by the processor 2903 to implement some or all of the ILDS that has been discussed. It is understood that there can be other applications that are stored in the memory 1206 and are executable by the processor 2903 as can be appreciated. Where any component discussed herein is implemented in the form of software, any one of a number of programming languages can be employed such as, for example, C, C++, C #, Objective C, Java®, JavaScript®, Perl, PHP, Visual Basic®, Python®, Ruby, Delphi®, Flash®, or other programming languages.

A number of software components are stored in the memory 2906 and are executable by the processor 2903. In this respect, the term "executable" means a program file that is in a form that can ultimately be run by the processor 2903. Examples of executable programs can be, for example, a compiled program that can be translated into machine code in a format that can be loaded into a random access portion of the memory 2906 and run by the processor 2903, source code that can be expressed in proper format such as object code that is capable of being loaded into a random access portion of the memory 2906 and executed by the processor 2903, or source code that can be interpreted by another executable program to generate instructions in a random access portion of the memory 2906 to be executed by the processor 2903, etc. An executable program can be stored in any portion or component of the memory 2906 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 2906 is defined herein as including both volatile and nonvolatile memory and data storage components. Volatile components are those that do not retain data values upon loss of power. Nonvolatile components are those that retain data upon a loss of power. Thus, the memory 2906 can comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM can comprise, for example, static random access memory (SRAM), dynamic random access memory (DRAM), or magnetic random access memory (MRAM) and other such devices. The ROM can comprise, for example, a programmable read-only memory (PROM), an erasable programmable read-only memory (EPROM), an electrically erasable programmable read-only memory (EEPROM), or other like memory device.

Also, the processor 2903 can represent multiple processors 2903 and the memory 2906 can represent multiple memories 2906 that operate in parallel processing circuits, respectively. In such a case, the local interface 2909 can be an appropriate network that facilitates communication between any two of the multiple processors 2903, between any processor 2903 and any of the memories 2906, or between any two of the memories 2906, etc. The local interface 2909 can comprise additional systems designed to coordinate this communication, including, for example, performing load balancing. The processor 2903 can be of electrical or of some other available construction.

Although the ILDS application 2915, application(s) 2918, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The ILDS of certain embodiments of the present disclosure can be implemented in hardware, software, firmware, or a combination thereof. For example, the ILDS can be implemented in software or firmware that is stored in a memory and that is executed by a suitable instruction execution system. If implemented in hardware, as in an alternative embodiment, the switching angle control technique can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Also, any logic or application described herein, including the ILDS application 2915 and/or application(s) 2918, that comprises software or code can be embodied in any non-transitory computer-readable medium for use by or in connection with an instruction execution system such as, for example, a processor 2903 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1% to about 5%, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional Therefore, at least the following is claimed:

1. A system for detection of gas leakage from a geologic storage site for remedial activities, comprising:
    at least one computing device;
    a plurality of permanent down-hole gauges (PDGs) disposed at different depths within a first well; and
    an evaluation system executable in the at least one computing device, the evaluation system causing the at least one computing device to:
        identify a leakage indicator based at least in part on a pressure change in the first well, the pressure change being determined from pressure data provided by at least one of the plurality of PDS;
        in response to the identification of the leakage indicator for the first well, determine a three-dimensional (3D) location of the gas leakage at a second well from the geologic storage site based at least in part upon the pressure change associated with the leakage indicator from the first well; and
        generate an interface that initiates at least one remedial activity associated with the 3D location and the leakage indicator, the interface based at least in part on the 3D location of the gas leakage and the leakage indicator.

2. The system of claim 1, wherein the geologic storage site stores carbon dioxide ($CO_2$).

3. The system of claim 1, wherein the geologic storage site stores natural gas.

4. The system of claim 1, comprising a monitoring system configured to cause the at least one computing device to periodically obtain pressure data from the plurality of PDGs.

5. The system of claim 1, wherein the location comprises a distance from the well to the gas leakage and a depth of the gas leakage.

6. The system of claim 1, wherein the plurality of PDGs are disposed within the first well and the second well.

7. The system of claim 1, wherein a monitoring system wirelessly communicates with the plurality of PDGs to obtain the pressure data.

8. The system of claim 1, wherein the evaluation system is configured to determine characteristic parameters from the pressure data, wherein the 3D location and the leakage indicator are determined based at least in part upon the characteristic parameters.

9. The system of claim 8, wherein the 3D location is determined based upon key performance indicators determined from the characteristic parameters.

10. The system of claim 9, wherein the key performance indicators are based upon cumulative characteristic parameters obtained over a period of time.

11. The system of claim 8, wherein the 3D location is determined using a first neural network and, in response to the 3D location, the leakage indicator is determined using a second neural network.

12. The system of claim 11, wherein the leakage indicator is a leakage rate.

13. A method for detection of gas leakage from a geologic storage site for remedial activities, the method comprising:
    receiving, by a computing device, pressure data provided by a plurality of permanent down-hole gauges (PDGs) disposed a first well and a second well associated with the geologic storage site, each of the one or more wells comprising multiple PDGs disposed at different depths within that well;
    identifying, by the computing device, a leakage indicator for the first well based at least in part on a pressure change in the pressure data;
    in response to the identification of the leakage indicator for the first well, determining, by the computing device, a three-dimensional (3D) location of the gas leakage at the second well based at least in part upon the pressure change associated with the first well; and
    initiating, by the computing device, at least one remedial activity associated with the 3D location and the leakage indicator based at least in part on the 3D location of the gas leakage and the leakage indicator.

14. The method of claim 13, wherein the geologic storage site stores carbon dioxide ($CO_2$).

15. The method of claim 13, wherein the geologic storage site stores natural gas.

16. The method of claim 13, wherein the plurality of PDGs are disposed in the first well and the second well.

17. The method of claim 16, wherein the first well comprises an observation well within the geologic storage site.

18. The method of claim 13, wherein the 3D location is determined, by the computing device, using a first neural network associated with the geologic storage site and the leakage indicator is determined, by the computing device, using a second neural network associated with the 3D location.

19. The method of claim 13, wherein the 3D location of the gas leakage includes a latitudinal coordinate and a longitudinal coordinate of the second well.

20. The method of claim 19, wherein the 3D location of the gas leakage is below a surface of the geologic storage site.

* * * * *